US012795482B2

(12) United States Patent
Dhanapal et al.

(10) Patent No.: US 12,795,482 B2
(45) Date of Patent: Nov. 10, 2026

(54) MOBILE-ASSISTED POWER-SAVING IN CELLULAR NETWORKS WITH NEW RADIO CELLS

(71) Applicant: Apple Inc., Cupertino, CA (US)

(72) Inventors: Muthukumaran Dhanapal, Sunnyvale, CA (US); Rajesh Ambati, Los Altos Hills, CA (US); Lakshmi N. Kavuri, San Jose, CA (US); Thanigaivelu Elangovan, Cupertino, CA (US); Ajay Singh, San Jose, CA (US); Raghuveer Mallikarjunan, Sunnyvale, CA (US); Sreevalsan Vallath, Dublin, CA (US); Divyaprakash P. Bhojkumar, Santa Clara, CA (US); Rohan C. Malthankar, San Jose, CA (US); Vivek Ramanna, San Jose, CA (US); Harshit Chuttani, Campbell, CA (US)

(73) Assignee: Apple Inc., Cupertino, CA (US)

( * ) Notice: Subject to any disclaimer, the term of this patent is extended or adjusted under 35 U.S.C. 154(b) by 669 days.

(21) Appl. No.: 17/589,754

(22) Filed: Jan. 31, 2022

(65) Prior Publication Data

US 2022/0286921 A1 Sep. 8, 2022

Related U.S. Application Data

(60) Provisional application No. 63/157,377, filed on Mar. 5, 2021.

(51) Int. Cl.
*H04W 36/08* (2009.01)
*H04W 36/00* (2009.01)
(Continued)

(52) U.S. Cl.
CPC ..... *H04W 36/08* (2013.01); *H04W 36/00222* (2023.05); *H04W 36/0058* (2018.08);
(Continued)

(58) Field of Classification Search
CPC ......... H04W 36/0022; H04W 36/0058; H04W 36/00837; H04W 36/08; H04W 36/32;
(Continued)

(56) References Cited

U.S. PATENT DOCUMENTS

2012/0208527 A1 8/2012 Park
2014/0329529 A1 11/2014 Jung et al.
(Continued)

FOREIGN PATENT DOCUMENTS

CN 103178938 A 6/2013
CN 104902584 A 9/2015
(Continued)

OTHER PUBLICATIONS

5G NR Stand Alone (SA) Requirement Analysis to Inter-Op with 4G, 5G Network Architectures, Sep. 5, 2020, 10 pages.
(Continued)

*Primary Examiner* — Michael Y Mapa
(74) *Attorney, Agent, or Firm* — Kilpatrick Townsend & Stockton LLP

(57) ABSTRACT

The present application relates to devices and components including apparatus, systems, and methods for user equipments and network components performing or assisting prioritization operations.

20 Claims, 22 Drawing Sheets

(51) Int. Cl.
*H04W 36/04* (2009.01)
*H04W 36/14* (2009.01)
*H04W 60/04* (2009.01)

(52) U.S. Cl.
CPC ..... *H04W 36/00838* (2023.05); *H04W 60/04* (2013.01); *H04W 36/1443* (2023.05)

(58) Field of Classification Search
CPC ..... H04W 60/04; H04W 36/14; H04W 48/20; H04W 36/0066; H04W 52/0248; H04W 76/27
USPC .................................. 370/331; 455/436–445
See application file for complete search history.

(56) References Cited

U.S. PATENT DOCUMENTS

| | | | | |
|---|---|---|---|---|
| 2016/0242191 | A1 | 8/2016 | Liao et al. | |
| 2017/0013518 | A1* | 1/2017 | Kilgour ............. | H04W 36/0066 |
| 2018/0110087 | A1 | 4/2018 | Cai et al. | |
| 2019/0306764 | A1 | 10/2019 | da Silva et al. | |
| 2020/0037213 | A1 | 1/2020 | Chen et al. | |
| 2020/0077314 | A1 | 3/2020 | Hwang et al. | |
| 2021/0037595 | A1 | 2/2021 | Jin et al. | |
| 2021/0136631 | A1* | 5/2021 | Lee ................... | H04W 36/0007 |
| 2022/0248256 | A1* | 8/2022 | Lee ................... | H04W 28/0268 |

FOREIGN PATENT DOCUMENTS

| | | | |
|---|---|---|---|
| CN | 111903157 | A | 11/2020 |
| CN | 112313992 | A | 2/2021 |
| EP | 3515115 | A1 | 7/2019 |
| KR | 100726656 | B1 | 6/2007 |
| KR | 20210016035 | A | 2/2021 |
| WO | 2010142166 | A1 | 12/2010 |
| WO | 2015000426 | A1 | 1/2015 |
| WO | 2017118399 | A1 | 7/2017 |
| WO | 2018082674 | A1 | 5/2018 |
| WO | 2020197458 | A1 | 10/2020 |
| WO | 2020229445 | A1 | 11/2020 |
| WO | 2021016048 | A1 | 1/2021 |

OTHER PUBLICATIONS

India Patent Application No. 202214008052, First Examination Report, Mailed on Sep. 16, 2022, 6 pages.

3rd Generation Partnership Project; Technical Specification Group Core Network and Terminals; Non-Access-Stratum (NAS) protocol for Evolved Packet System (EPS); Stage 3 (Release 17), 3GPP TS 24.301 V17.1.0, Dec. 2020, 587 pages.

ZTE Corporation, Sanechips, Chin a Southern Power Grid Co., Ltd,, CR-Form-v11.4, entitled "Introduction of efficient transition out of RRC_Connected by UE assistance in TS38.331," 3GPP TSG-RAN WG2 Meeting #107bis, R2-1912674, Change Request 38.331, CR xxxx, rev—Current version: 15.7.0, Chongqing, China, Oct. 14-18, 2019 in 15 pages.

SA WG2 Temporary Document, entitled "Updates to CN assisted eNB parameter tuning solution," SA WG2 Meeting #97, S2-13xxxx, (revision of S2-13xxxx), May 27-31, 2013, Busan, South Korea in 5 pages.

CR-Form-v11.1, entitled "Light RRC Connection Feature specification in 36.331," 3GPP TSG-RAN WG2 Meeting #97 R2-1702421, Change Request 36.331, CR 2648, rev 3, Current version: 14.1.0, Athens, Greece, Feb. 13-17, 2017 in 81 pages.

Patent Search Report issued in Application No. 2022101767481, dated Feb. 25, 2022 in 15 pages.

First Examination Report issued in India Application No. IN202315015811, dated Jul. 5, 2024 in 6 pages.

Office Action issued in China Application No. CN202210176748.1, dated Jul. 16, 2024 in 12 pages.

China Office Action issued CN202210176748.1, dated Jan. 15, 2024 in 15 pages.

* cited by examiner

MOBILE-ASSISTED POWER-SAVING IN CELLULAR NETWORKS WITH NEW RADIO CELLS

RELATED APPLICATIONS

The present application claims priority to U.S. Provisional Patent Application No. 63/157,377, filed Mar. 5, 2021, which is hereby incorporated by reference in its entirety.

BACKGROUND

Mobile devices, or "user equipments (UEs)," operating in cellular networks benefit from power saving enhancements that do not compromise user experience. Consideration of system performance aspects with respect to power saving enhancements for UEs in connected and idle states is needed.

DETAILED DESCRIPTION

Figure 1:
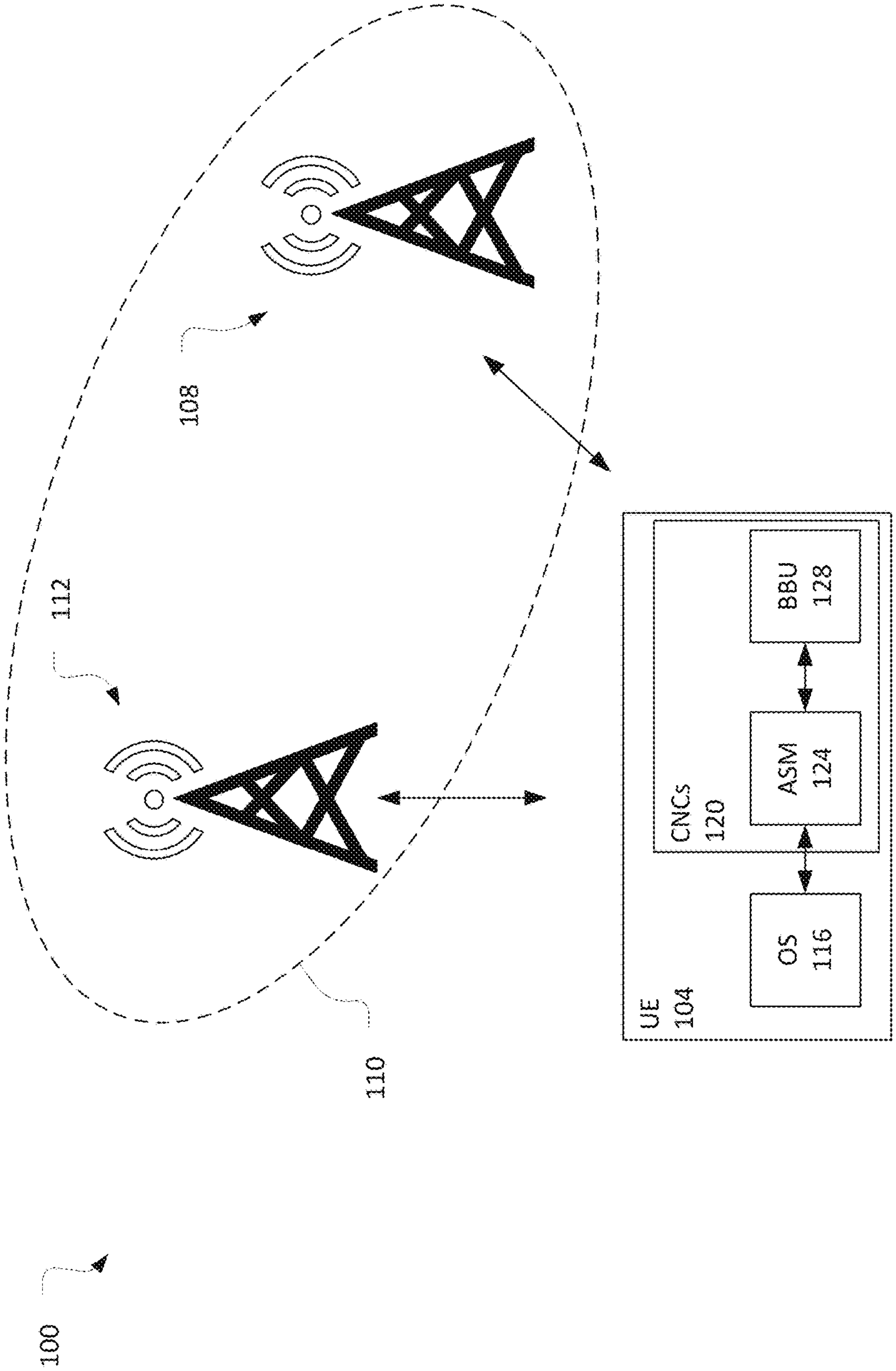
FIG. 1 illustrates a network environment in accordance with some aspects.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some aspects. The network environment 100 may include a UE 104 and one or more base stations such as, for example, next generation node B (108) and evolved node B (eNB) 112. The base stations, which may be generically referred to as network (NW) 110, may provide wireless access cells through which the UE 104 may communicate. The gNB 108 may provide a 3GPP New Radio (NR) cell and the eNB 112 may provide a 3GPP Long Term Evolution (LTE) cell, which may also be referred to as an evolved universal terrestrial radio access network (EUTRAN). The air interfaces over which the UE 104 and base stations communicate may be compatible with 3GPP technical specifications (TSs) such as those that define Fifth Generation (5G) LTE and NR system standards.

The gNB 108 may be a standalone (SA) base station that provides an NR cell that may be accessed independently from an LTE cell. Alternatively, the gNB 108 may be a non-standalone (NSA) base station that uses multi-radio access technology (RAT) dual connectivity (DC) to provide access in conjunction with an LTE cell. For example, the LTE cell provided by eNB 112 may be a primary serving cell (PCell) while the NR cell provided by the gNB 108 may be a secondary serving cell (SCell). This may be referred to as an EUTRAN-NR dual connectivity (ENDC) system. The LTE PCell may be the anchor cell that provides some or all of the control signaling through signaling radio bearers (SRBs), while the NR SCell provides one or more data radio bearers (DRBs) to increase throughput capability of the system.

The UE 104 may have a number of components that perform various operations at different levels of a protocol stack. For example, the UE 104 may include an operating system (OS) 116 implemented by application circuitry (for example, a CPU) such as that described in FIG. 21. The OS 116 may manage interoperability of hardware and software components of the UE 104. The OS 116 may manage processes, interrupts, memory accesses, file systems, device drivers, networking, security, input-output tasks, etc.

With respect to network operations, the OS 116 may be coupled with cellular-network components (CNCs) 120. The CNCs may provide operations with respect to communicating with cellular networks via wireless access cells such as those provided by the gNB 108 and the eNB 112. The CNCs 120 may be implemented by baseband circuitry such as that described in FIG. 21. The CNCs 120 may include an access stratum manager (ASM) 124 and a baseband unit (BBU) 128. The BBU 128 may perform baseband operations under the control of the ASM 124. The ASM 124 may control the BBU 128 based on signaling from the OS 116 as described herein. The ASM 124 and the BBU 128 may be implemented by different hardware components of a baseband circuitry; or they may be merged with one another and implemented by the same or at least common circuitry.

The BBU 128 may include radio resource control (RRC) state machines that perform operations related to RRC procedures including, for example, paging, RRC connection establishment, RRC connection reconfiguration, and RRC connection release.

The RRC state machine may transition the UE 104 into one of a number of RRC states (or "modes") including, for example, a connected state (RRC connected), an inactive state (RRC inactive), and an idle state (RRC idle). A UE may start in RRC idle when it first camps on a cell, which may be after the UE is switched on or after an inter-system cell reselection. To engage in active communications, the RRC state machine may transition the UE 104 from RRC idle to RRC connected by performing an RRC setup procedure to establish a logical connection, for example, an RRC connection, with a base station. In RRC connected, the UE 104 may be configured with at least one SRB for signaling (for example, control messages) with the base station; and one or more DRBs for data transmission. When the UE is less actively engaged in network communications, the RRC state machine may transition the UE from RRC connected to RRC inactive using an RRC release procedure. The RRC inactive state may allow the UE 104 to reduce power consumption as compared to RRC connected, but will still allow the UE 104 to quickly transition back to RRC connected to transfer application data or signaling messages.

While in RRC idle state, the UE 104 may scan for synchronization signals transmitted by a base station before decoding system information. The system information may provide parameters used to access the cell and to receive paging messages. The system information may be broadcast by a base station in a master information block (MIB) within a physical broadcast channel (PBCH) and system information blocks (SIBs) in the PDSCH.

The amount of platform resources required to monitor a cell while in the RRC idle state may be based on the type of monitored cell (for example, an NR cell or an LTE cell) and a bandwidth of the cell. For example, the UE 104 may use more resources if it is camped on an NR SA cell with a relatively large bandwidth (for example, above 20 megahertz (MHz)), as opposed to an LTE cell, or an NR cell with a relatively small bandwidth (for example, 20 MHz or below). In some embodiments, the OS 116 may operate in a smart data mode (SDM) to dynamically prioritize NR SA camping based on the operational state or condition of the UE 104. For example, if the UE 104 is in an operational state/condition that is associated with a relatively high likelihood of significant data/signaling loads, an SDM trigger may prioritize NR SA camping (for example, camping on an SA NR cell may be prioritized over camping on other cells). On the other hand, if the UE 104 is in an operational state that is associated with a relatively low likelihood of significant data/signaling loads, an SDM trigger may deprioritize SA camping (for example, camping on other cells, such as an LTE cell, may be prioritized over camping on an SA NR cell). In some embodiments, the SDM trigger to deprioritize NR SA camping may only be issued in the event that the available NR PCell bandwidth is greater than a predetermined threshold (for example, 20 MHz) and, therefore, provides an increased power-saving opportunity.

If NR SA is deprioritized, the BBU 128 may induce an NR-to-LTE (NR2L) reselection to change the camped-on cell from the NR cell to the LTE cell. The BBU 128 may additionally/alternatively, block an LTE-to-NR (L2NR) redirection that would change the UE from a connected state with an LTE cell to an idle state with an NR cell.

In some embodiments, NR SA deprioritization may not be triggered in the event an established or to-be established RRC connection handles voice or e911 calls. Also, in the event a deprioritization has already occurred when voice/e911 call occurs, NR SA may be reprioritized.

If NR SA is reprioritized, the BBU 128 will reset and go back to being camped on the NR cell.

The ASM 124 may efficiently manage the dynamic prioritization of SA camping based on SDM triggers as described herein. This may result in the UE 104 being able to achieve significant power savings.

FIGS. 2-15 include signaling diagrams that illustrate tasks/operations performed by the ASM 124 BBU 128, and NW 110 and signaling therebetween. The tasks/operations 20 described as being performed by separate components may be performed by a common component in other embodiments. For example, in some embodiments the tasks/operations performed by the ASM 124 and BBU 128 may both be performed by the same component.

Figure 2:
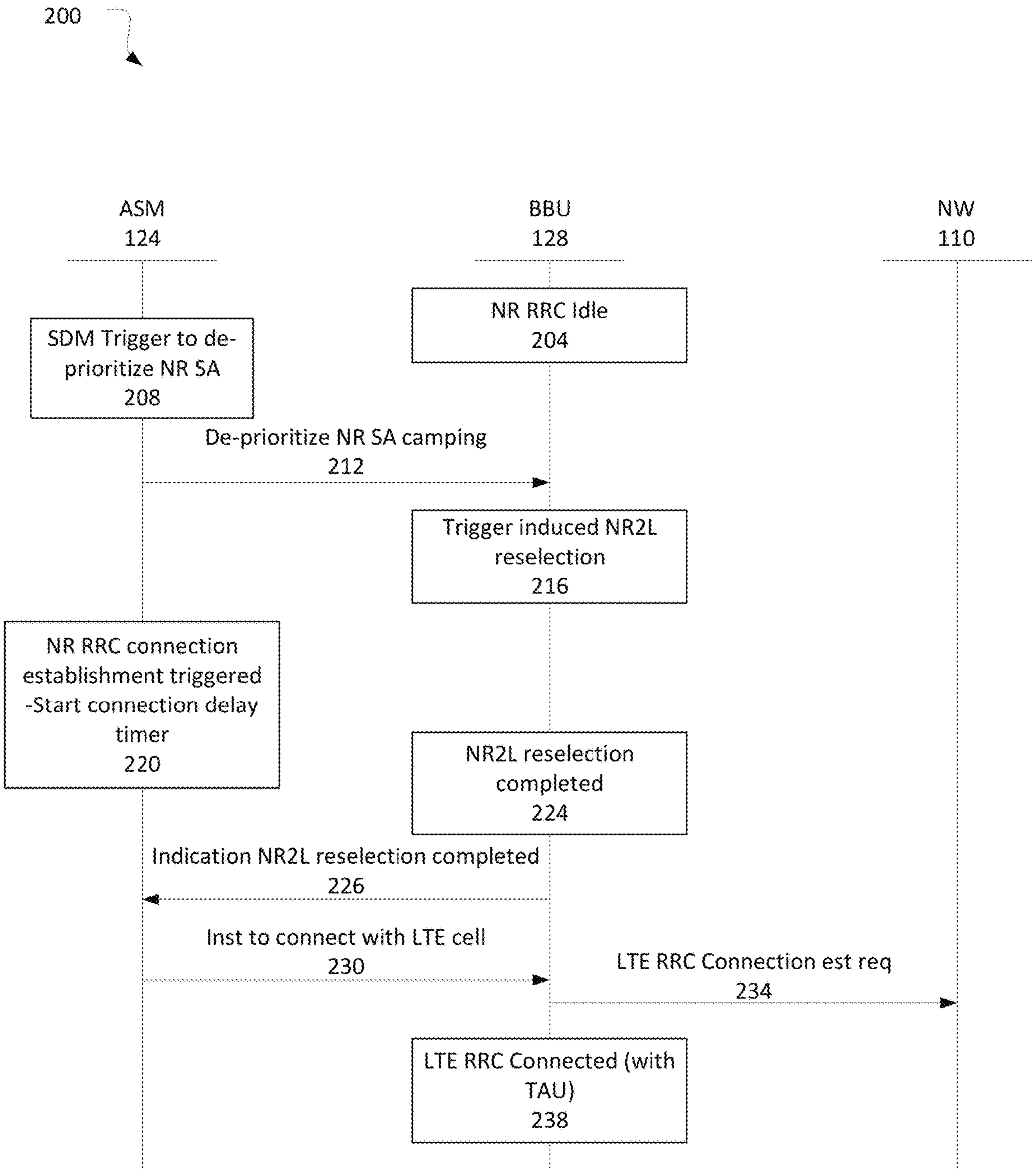
FIG. 2 illustrates a signaling diagram in accordance with some aspects.

FIG. 2 illustrates a signaling diagram 200 in accordance with some embodiments. The signaling diagram 200 describes the UE 104 detecting an SDM trigger to deprioritize NR SA camping while camped on an NR cell.

The signaling diagram 200 may include, at 204, the BBU 128 operating in an NR RRC idle state. For example, the UE 104 may be camped on an NR cell provided by the gNB 108.

At 208, the ASM 124 may detect an SDM trigger to deprioritize NR SA camping. The ASM 124 may detect the SDM trigger by receiving a control signal from the OS 116. Additionally/alternatively, the ASM 124 may independently detect one or more conditions that may be interpreted as the SDM trigger.

At 212, the ASM 124 may transmit, to the BBU 128, a signal to deprioritize NR SA camping. Again, while some embodiments describe signaling between the ASM 124 and the BBU 128, in some embodiments the ASM 124 and the BBU 128 may be embodied in the same component. Thus, the signaling may be considered inter-component signaling or intra-component signaling.

At 216, BBU 128 may trigger an induced NR2L reselection. An NR2L reselection may involve transitioning from being camped on (and monitoring broadcast information from) an NR cell to being camped on (and monitoring broadcast information from) an LTE cell. The NR2L reselection process may take a period of time to complete.

At 220, the ASM 124 may detect a trigger event that compels establishment of an NR RRC connection. This may occur when the OS 116 provides an indication that it has data to transmit to the NW 110. In the event the NR2L reselection is not yet completed, the ASM 124 may start a connection delay timer upon detecting the NR RRC connection trigger.

At 224, the BBU 128 may determine that the NR2L reselection has completed and transmit a corresponding indication to the ASM 124 at 226. In other embodiments, the ASM 124 may determine whether the NR2L reselection is complete based on a status of a register or some other indication.

Upon determining that the NR2L is complete and the connection delay timer has not yet expired, the ASM 124 may, at 230, transmit an instruction to the BBU 128 to connect with the LTE cell.

At 234, the BBU 128 may transmit an LTE RRC connection establishment request to the eNB 112 of the NW 110.

At 238, the RRC state machine of the BBU 128 may enter an LTE RRC connected state. In some embodiments, a tracking area update (TAU) may be performed as part of, or after, transitioning to the LTE RRC connected state.

Delaying the connection request by using the connection delay timer may pend or pause the connection establishment procedure to allow the NR2L reselection procedure to complete. In this manner, once the reselection completes, the connection request may be sent to the desired cell (for example, the LTE cell provided by the eNB 112) consistent with the SDM trigger to deprioritize NR SA.

Figure 3:
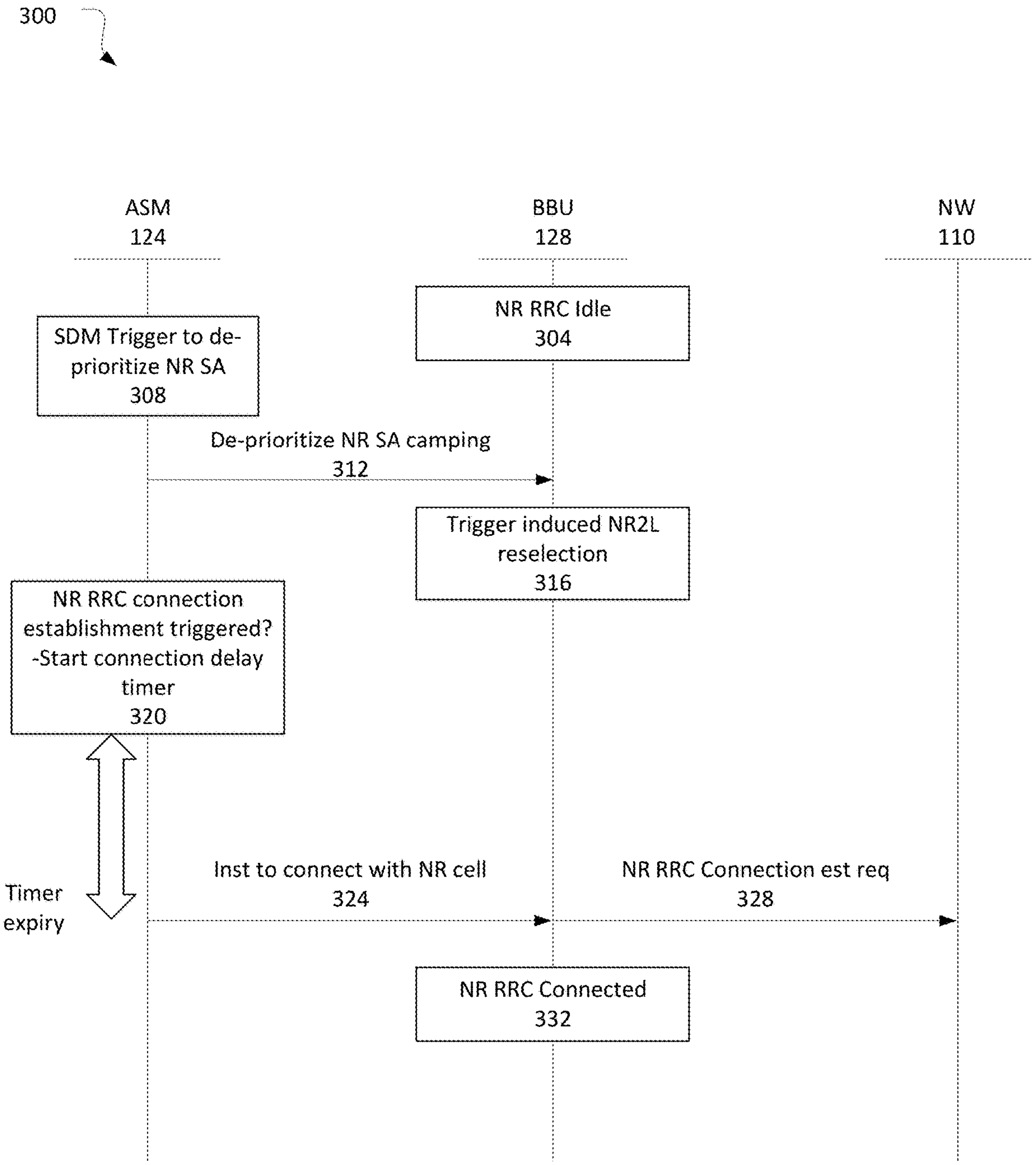
FIG. 3 illustrates another signaling diagram in accordance with some aspects.

FIG. 3 illustrates a signaling diagram 300 in accordance with some embodiments. The signaling diagram 300 describes the UE 104 detecting an SDM trigger to deprioritize NR SA camping while camped on an NR cell.

Operations 304, 308, 312, 316, and 320 of signaling diagram 300 may be similar to corresponding operations described with respect to signaling diagram 200.

In contrast to signaling diagram 200, in signaling diagram 300 the NR2L reselection process may not be completed before timer expiry. Upon expiration of the connection delay timer, the ASM 124 may transmit, to the BBU 128, an instruction to connect with an NR cell at 324. The BBU 128 may then, at 328, transmit an NR RRC connection establishment request to the gNB 108 of the NW 110.

At 332, the RRC state machine of the BBU 128 may enter an NR RRC connected state.

In some instances, the NR2L reselection process may not complete in a timely manner. In these instances, the connection delay timer may prevent an unacceptable delay in establishing an RRC connection to transmit data. While establishing the RRC connection with the NR cell may prevent the reselection process from completing, it may be desired to avoid impactful and noticeable delays on data transmission. Once the UE 104 is in the NR RRC connected state, the NW 110 may have control over inter-RAT mobility. Thus, if desired, the NW 110 may handover the connection from the NR cell to the LTE cell.

Figure 4:
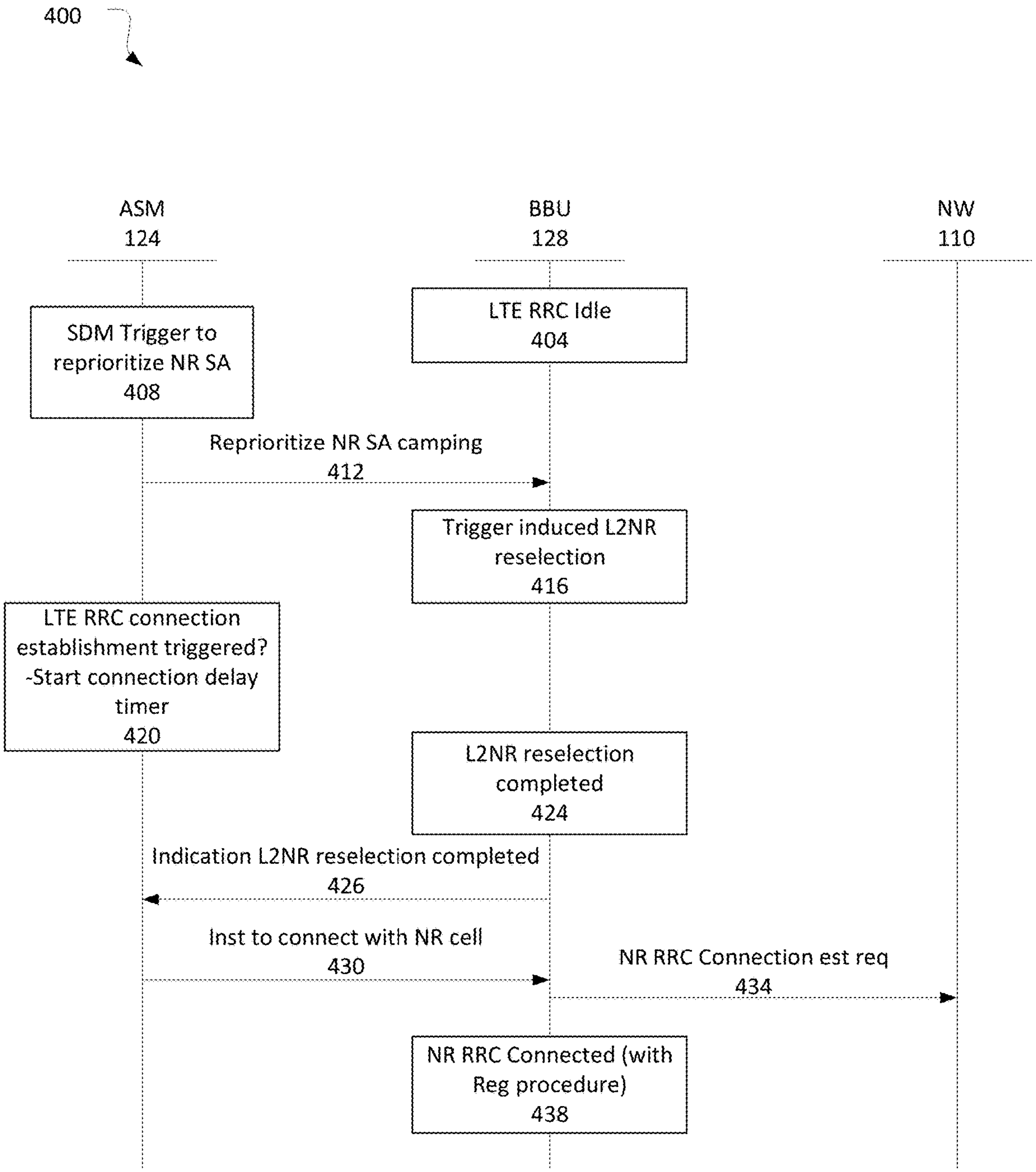
FIG. 4 illustrates another signaling diagram in accordance with some aspects.

FIG. 4 illustrates a signaling diagram 400 in accordance with some embodiments. The signaling diagram 400 describes the UE 104 detecting an SDM trigger to reprioritize NR SA camping while camped on an LTE cell.

The signaling diagram 400 may include, at 404, the BBU 128 operating in an LTE RRC idle state. For example, the UE 104 may be camped on an LTE cell provided by the eNB 112.

At 408, the ASM 124 may detect an SDM trigger to reprioritize NR SA camping. NR SA camping may be reprioritized in the event that UE 104 has transitioned back to an operational state/condition that is associated with a relatively high likelihood of significant data/signaling loads. The ASM 124 may detect the SDM trigger by receiving a control signal from the OS 116. Additionally/alternatively, the ASM 124 may independently detect one or more conditions that may be interpreted as the SDM trigger.

At 412, the ASM 124 may transmit, to the BBU 128, a signal to reprioritize NR SA camping.

At 416, BBU 128 may trigger an L2NR reselection. An L2NR reselection may involve transitioning from being camped on (and monitoring broadcast information from) an LTE cell to being camped on (and monitoring broadcast information from) an NR cell. The L2NR reselection process may take a period of time to complete.

At 420, the ASM 124 may detect a trigger event that compels establishment of an LTE RRC connection. This may occur when the OS 116 provides an indication that it has data to transmit to the NW 110. In the event the L2NR reselection is not yet completed, the ASM 124 may start a connection delay timer upon detecting the LTE RRC connection trigger.

At 424, the BBU 128 may determine that the L2NR reselection has completed and transmit a corresponding indication to the ASM 124 at 426. In other embodiments, the ASM 124 may determine whether the L2NR reselection is complete based on a status of a register or some other indication.

Upon determining that the L2NR reselection is complete and the connection delay timer has not yet expired, the ASM 124 may, at 430, transmit an instruction to the BBU 128 to connect with the NR cell.

At 434, the BBU 128 may transmit an NR RRC connection establishment request to the gNB 108 of the NW 110.

At 438, the RRC state machine of the BBU 128 may enter an NR RRC connected state. In some embodiments, a registration procedure may be performed as part of, or after, transitioning to the NR RRC connected state.

Delaying the connection request by using the connection delay timer may allow the L2NR reselection procedure to complete before sending the connection request. This may prevent the connection request being sent to the eNB 112 prior to completion of the L2NR reselection procedure, which may prevent successful reselection to the NR cell consistent with the SDM trigger to reprioritize NR SA.

Figure 5:
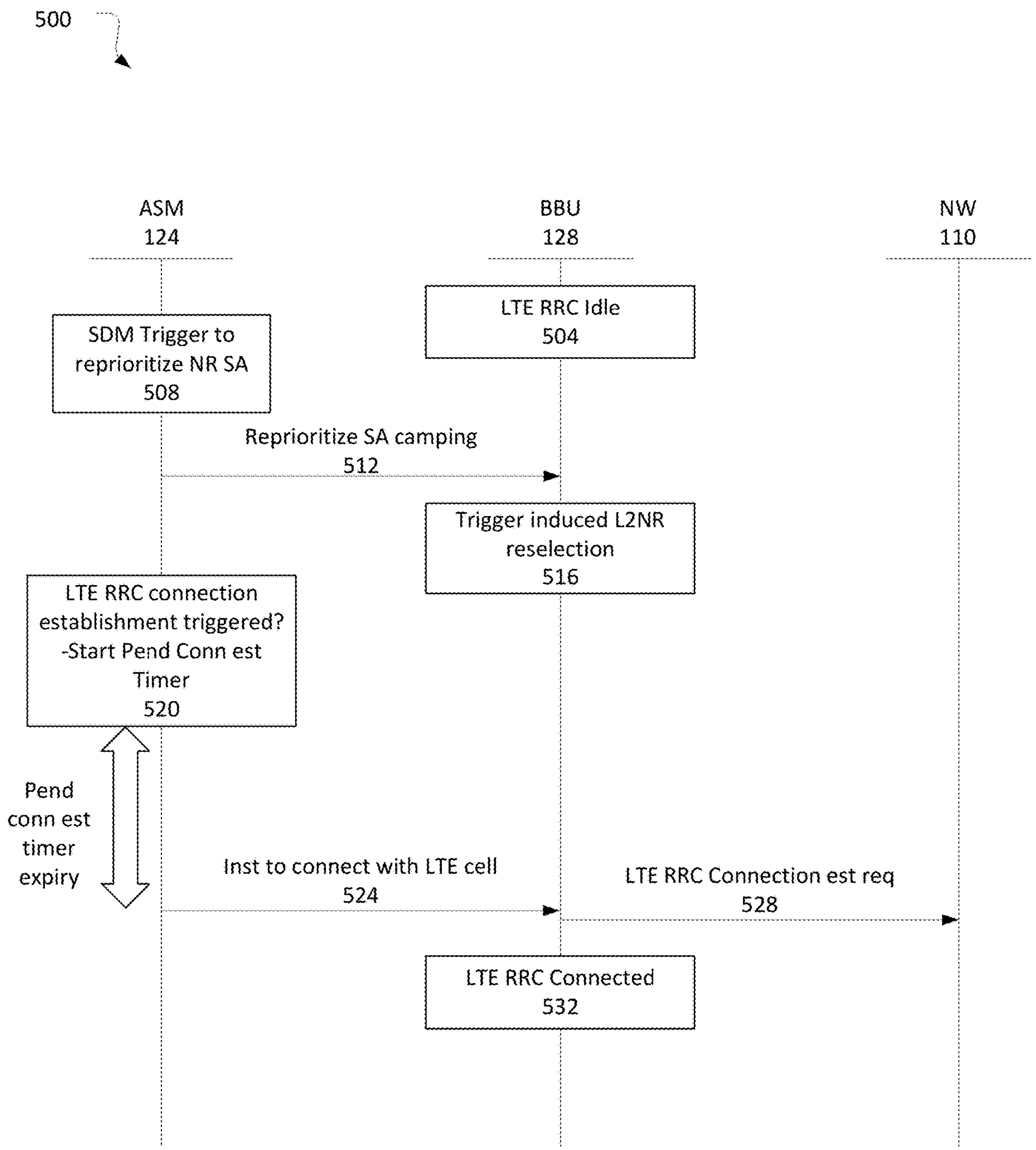
FIG. 5 illustrates another signaling diagram in accordance with some aspects.

FIG. 5 illustrates a signaling diagram 500 in accordance with some embodiments. The signaling diagram 500 describes the UE 104 detecting an SDM trigger to reprioritize NR SA camping while camped on an LTE cell.

Operations 504, 508, 512, 516, and 520 of signaling diagram 500 may be similar to corresponding operations described with respect to signaling diagram 400.

In contrast to signaling diagram 400, in signaling diagram 500, the L2NR reselection process may not be completed before timer expiry. Upon expiration of the connection delay timer, the ASM 124 may transmit, to the BBU 128, an instruction to connect with an NR cell at 524. The BBU 128 may then, at 528, transmit an LTE RRC connection establishment request to the eNB 112 of the NW 110.

At 532, the RRC state machine of the BBU 128 may enter an LTE RRC connected state.

Similar to the description above with respect to FIG. 3, the connection delay timer may prevent a slow reselection process from causing an unacceptable delay in establishing an RRC connection to transmit data. Once the UE 104 is in the LTE RRC connected state, the NW 110 may have control over inter-RAT mobility. Thus, if desired, the NW 110 may handover the connection from the LTE cell to the NR cell.

Figure 6:
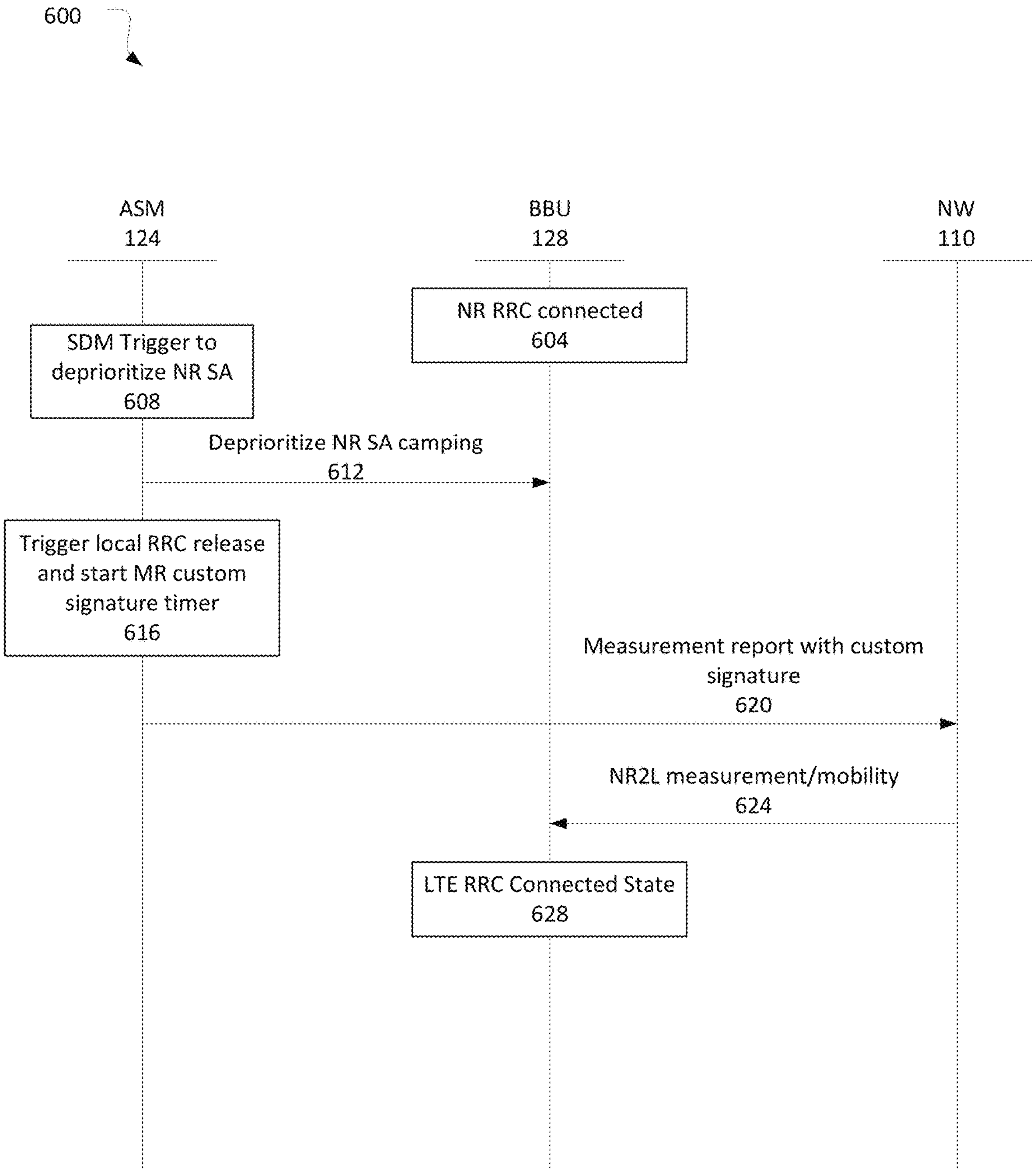
FIG. 6 illustrates another signaling diagram in accordance with some aspects.

FIG. 6 illustrates a signaling diagram 600 in accordance with some embodiments. The signaling diagram 600 describes the UE 104 detecting an SDM trigger to deprioritize NR SA camping while connected with an NR cell.

The signaling diagram 600 may include, at 604, the BBU 128 operating in an NR RRC connected state. For example, the UE 104 may be connected with an NR cell provided by the gNB 108.

At 608, the ASM 124 may detect the SDM trigger to deprioritize NR SA camping.

At 612, the ASM 124 may transmit, to the BBU 128, a signal to deprioritize NR SA camping.

NR2L reselection may not be applicable while the BBU 128 is in an RRC connected state. Thus, in this instance, the BBU 128 may not trigger the NR2L reselection as described above. Instead, at 616, the ASM 124 may trigger a local RRC release and start a measurement report (MR) custom signature timer. While the local RRC release may be triggered at 616, the ASM 124 may delay providing the BBU 128 instructions to act on the local RRC release based on the MR custom signature timer.

At 620, the ASM 124 may transmit, or cause the BBU 128 to transmit, a measurement report with a custom signature. The measurement report may be transmitted to the gNB 108 of the NW 110. The custom signature that is included in the measurement report may be a predetermined signature that provides a signal to the gNB 108 that indicates the UE 104 requests a redirection to an LTE cell pursuant to the SDM trigger to deprioritize NR SA.

The measurement report may include, as its measurement identifier (ID), a predetermined un-configured measurement ID. An un-configured measurement ID is one that the base station has not configured to the UE 104 for use in reporting measurements. In some embodiments, the un-configured measurement ID used as the custom signature may be the maximum un-configured measurement ID. The measurement report may further include a serving cell ID or a physical cell ID that are set to the maximum allowed values. In some embodiments, the measurement report with the custom signature may be as follows.

NR Meas Report Custom Signature:

```
MeasResults ::= SEQUENCE
{
  measID measId,                       --> MAX un-configured Meas Id
  MeasResultServMO ::= SEQUENCE
  {
    servCellId ServCellIndex,          --> 31 (MAX)
    MeasResultNR ::= SEQUENCE
    {
      phyCellId PhysCellId OPTIONAL,   --> 1007 (MAX)
    }
  }
}.
```

Upon receiving the custom signature, the gNB 108 will understand that the measurement results do not reflect the results of actual measurements. Instead, the measurement report with the custom signature is to be used as a signal that the UE 104 requests that the connection be moved from the NR cell to the LTE cell. Thus, the NW 110 may respond by transmitting NR2L measurement and mobility parameters to the BBU 128 at 624. The measurement and mobility parameters, which may be included in an inter-radio access technology (RAT) handover command, may facilitate transferring the connection from the NR cell to the LTE cell.

At 628, the BBU 128 may transition to the LTE RRC connected state based on the NR2L measurement and mobility parameters.

Figure 7:
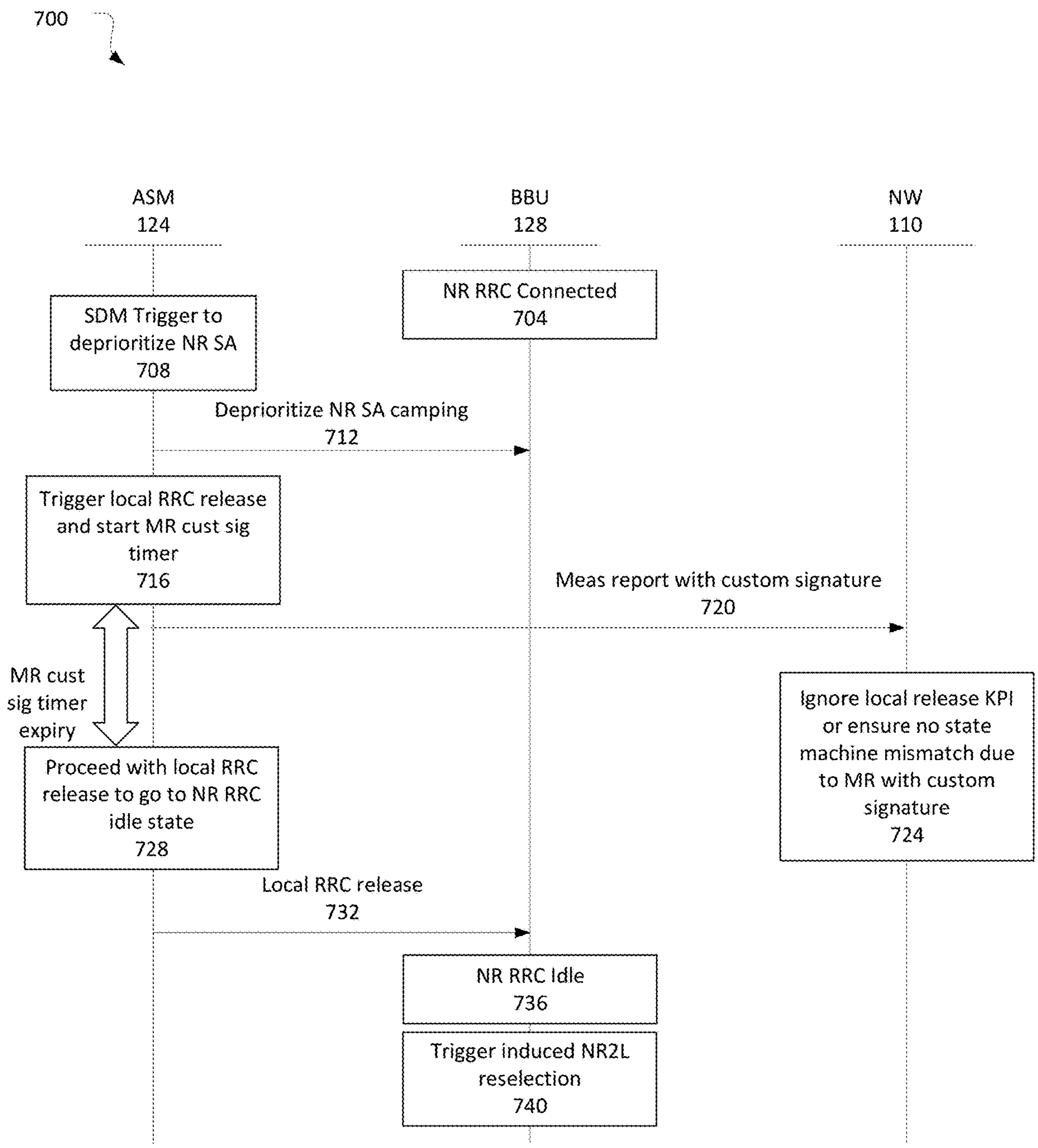
FIG. 7 illustrates another signaling diagram in accordance with some aspects.

FIG. 7 illustrates a signaling diagram 700 in accordance with some embodiments. The signaling diagram 700 describes the UE 104 detecting an SDM trigger to deprioritize NR SA camping while connected with an NR cell.

Operations 704, 708, 712, and 716 of signaling diagram 700 may be similar to corresponding operations described with respect to signaling diagram 600. However, in this embodiment, the NW 110 may not provide full NR-to-LTE mobility support. For example, the NW 110 may not choose, or be configured, to provide the measurement and mobility parameters to facilitate NR-to-LTE mobility as described above with respect to signaling diagram 600. Instead, the NW 110 may use the measurement report with custom signature 720 as an indication to ignore key performance indicators (KPIs) that may be impacted by a local release at 724. By ignoring the KPIs that may be impacted by a local release, the NW 110 may avoid a negative KPI impact and, therefore, still provide some level of support. In some embodiments, the support provided at 724 may additionally/alternatively include ensuring that no state machine mismatch results due to receipt of the MR with the custom signature. For example, the NW 110 may not update a state machine based on the measurement results in a measurement report that includes the custom signature given that the measurement results do not reflect actual measurements taken by the UE 104.

If the MR custom signature timer expires without the ASM 124 receiving measurement and mobility parameters, the ASM 124 may proceed with the local RRC release to go to NR RRC idle state at 728.

At 732, the ASM 124 may provide an instruction to the BBU 128 to proceed with the local RRC release. The BBU 128 may then transition to NR RRC idle state at 736.

At 740, the BBU 128 may trigger the induced NR2L reselection to change the camped-on cell from the NR cell to the LTE cell.

Figure 8:
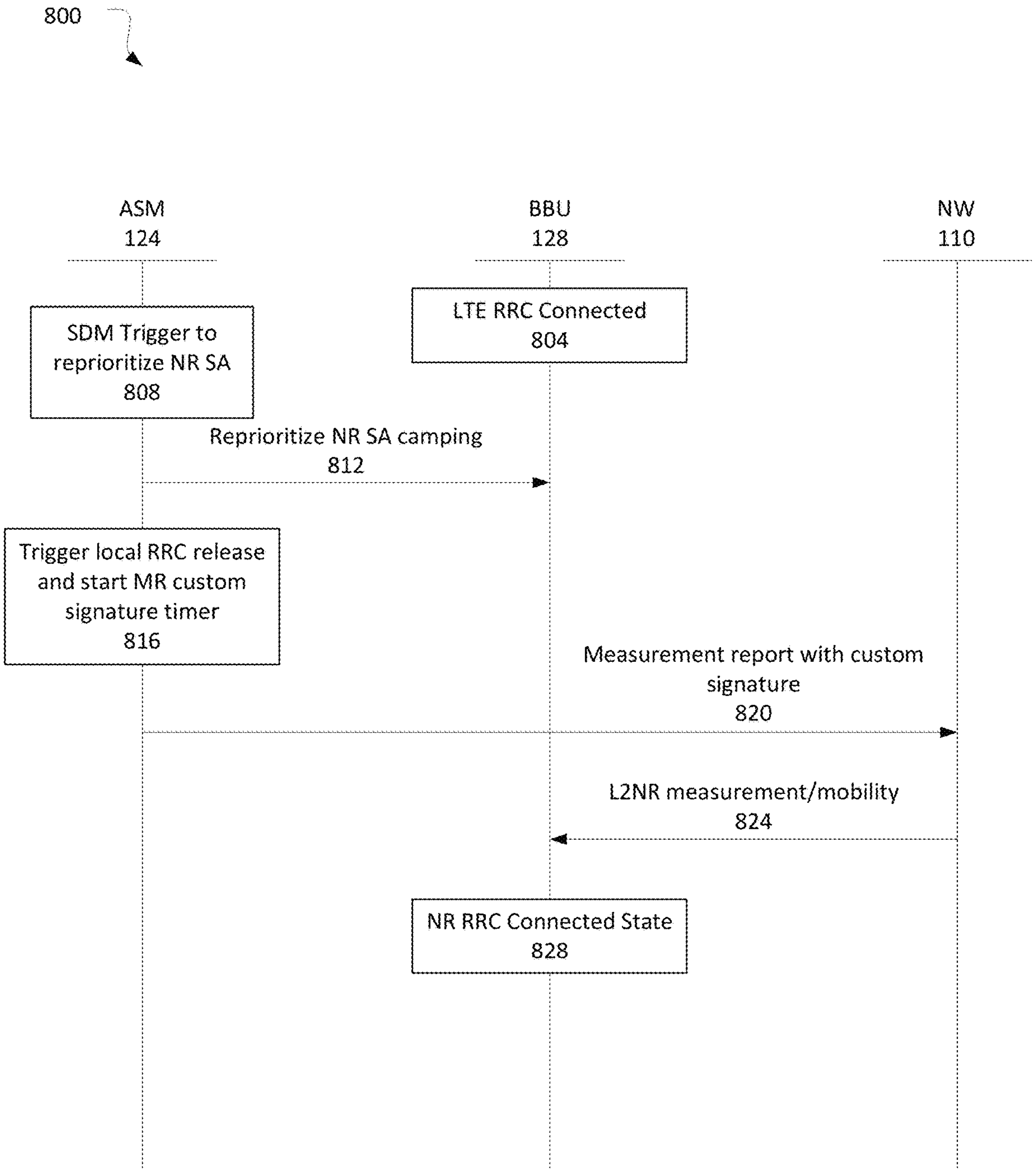
FIG. 8 illustrates another signaling diagram in accordance with some aspects.

FIG. 8 illustrates a signaling diagram 800 in accordance with some embodiments. The signaling diagram 800 describes the UE 104 detecting an SDM trigger to reprioritize NR SA camping while connected with an LTE cell.

At 804, the BBU 128 may be operating in an LTE RRC connected state. For example, the UE 104 may be connected with an LTE cell provided by the eNB 112.

At 808, the ASM 124 may detect the SDM trigger to reprioritize NR SA camping.

At 812, the ASM 124 may transmit, to the BBU 128, a signal to reprioritize NR SA camping.

Similar to NR2L reselection, L2NR reselection may not be applicable while the BBU 128 is in an RRC connected state. Thus, in this instance, the BBU 128 may trigger a local release and start an MR custom signature timer at 816; however, the BBU 128 may delay transmission of an instruction to the BBU 128 to proceed with the local release.

At 820, the ASM 124 may transmit, or cause the BBU 128 to transmit, a measurement report with a custom signature. The measurement report may be transmitted to the eNB 112 of the NW 110. As described above, the custom signature that is included in the measurement report may provide a signal to the eNB 112 that indicates the UE 104 requests the redirection to an NR cell pursuant to the SDM trigger to reprioritize NR SA.

In some embodiments, the measurement report with the custom signature may be as follows.

LTE Meas Report Custom Signature:

```
MeasResults ::= SEQUENCE
{
  measID measId,                   --> MAX un-configured Meas Id
  MeasResultPCell SEQUENCE
  {
    rsrpResult RSRP-Range,         --> 97 (MAX)
    rsrqResult RSRQ-Range          --> 34 (MAX)
    }
  }
}.
```

The LTE measurement report with the custom signature may use, for the measurement ID, a maximum un-configured measurement ID similar to the NR measurement report with the custom signature. The LTE measurement report with the custom signature may also include a maximum reference signal receive power (RSRP) value of 97 or a maximum reference signal receive quality (RSRQ) value of 34.

At 824, the BBU 128 may receive L2NR measurement and mobility parameters from the NW 110. The measurement and mobility parameters may facilitate transferring the connection from the LTE cell to the NR cell.

At 828, the BBU 128 may transition to the RRC connected state based on the L2NR measurement and mobility parameters.

Figure 9:
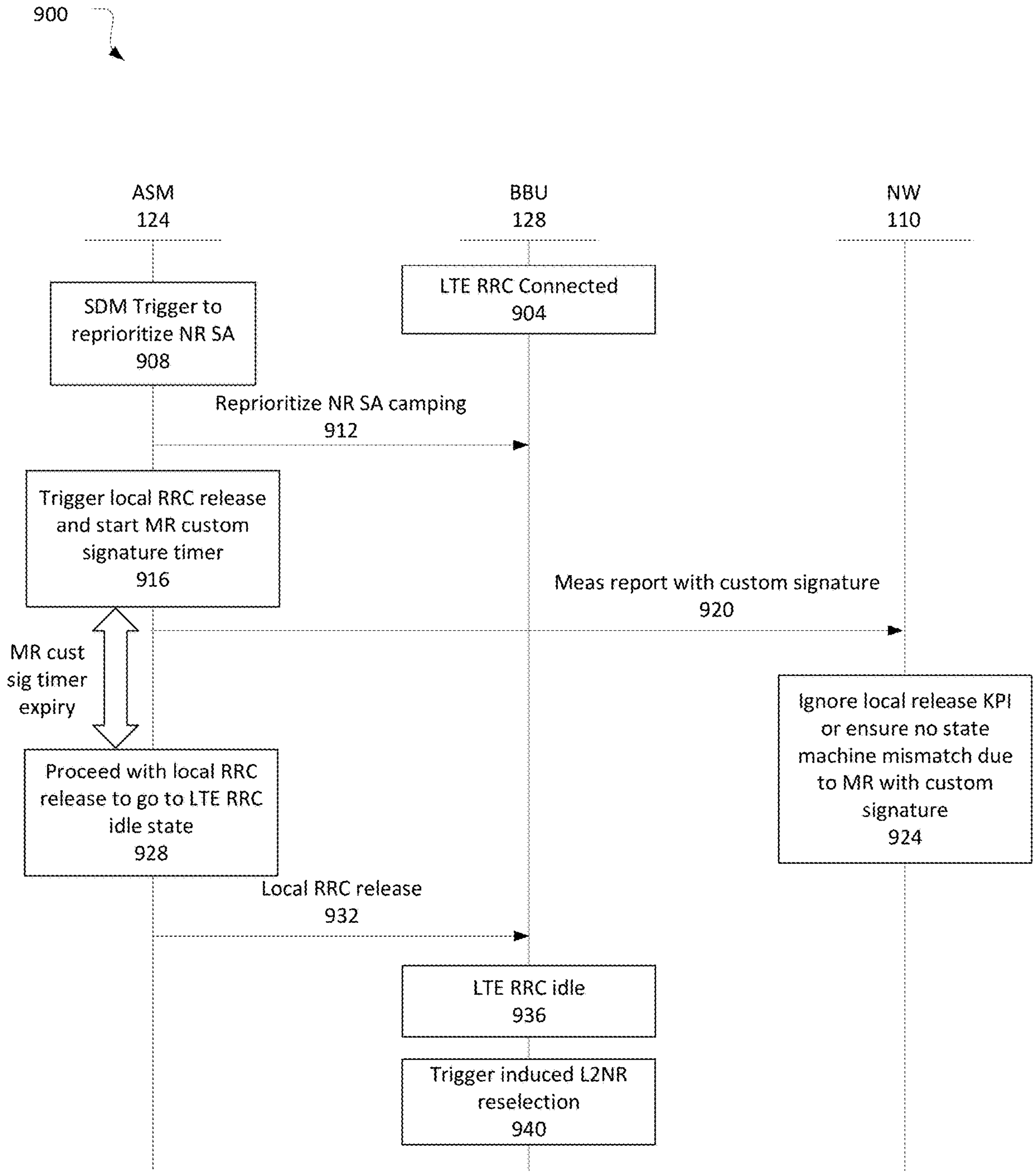
FIG. 9 illustrates another signaling diagram in accordance with some aspects.

FIG. 9 illustrates a signaling diagram 900 in accordance with some embodiments. The signaling diagram 900 describes the UE 104 detecting an SDM trigger to reprioritize NR SA camping while connected with an LTE cell.

Operations 904, 908, 912, and 916 of signaling diagram 900 may be similar to corresponding operations described with respect to signaling diagram 800. However, in this embodiment, the NW 110 may not provide full LTE-to-NR mobility support. For example, the NW 110 may not choose, or be configured, to provide the measurement and mobility parameters to facilitate LTE-to-NR mobility as described above with respect to signaling diagram 800. Instead, the NW 110 may use the measurement report with custom signature 920 as an indication to perform the backed-off support operations described above with respect to 724 of FIG. 7. For example, the NW 110 may, at 924, ignore KPIs that may be impacted by a local release or ensure that no state machine mismatch results due to receipt of the MR with the custom signature.

If the MR custom signature timer expires without the ASM 124 receiving measurement and mobility parameters, the ASM 124 may proceed with the local RRC release to go to the LTE RRC idle state at 928.

At 932, the ASM 124 may provide an instruction to the BBU 128 to proceed with the local RRC release. The BBU 128 may then transition to the LTE RRC idle state at 936.

At 940, the BBU 128 may trigger the induced L2NR reselection to change the camped-on cell from the LTE cell to the NR cell.

Figure 10:
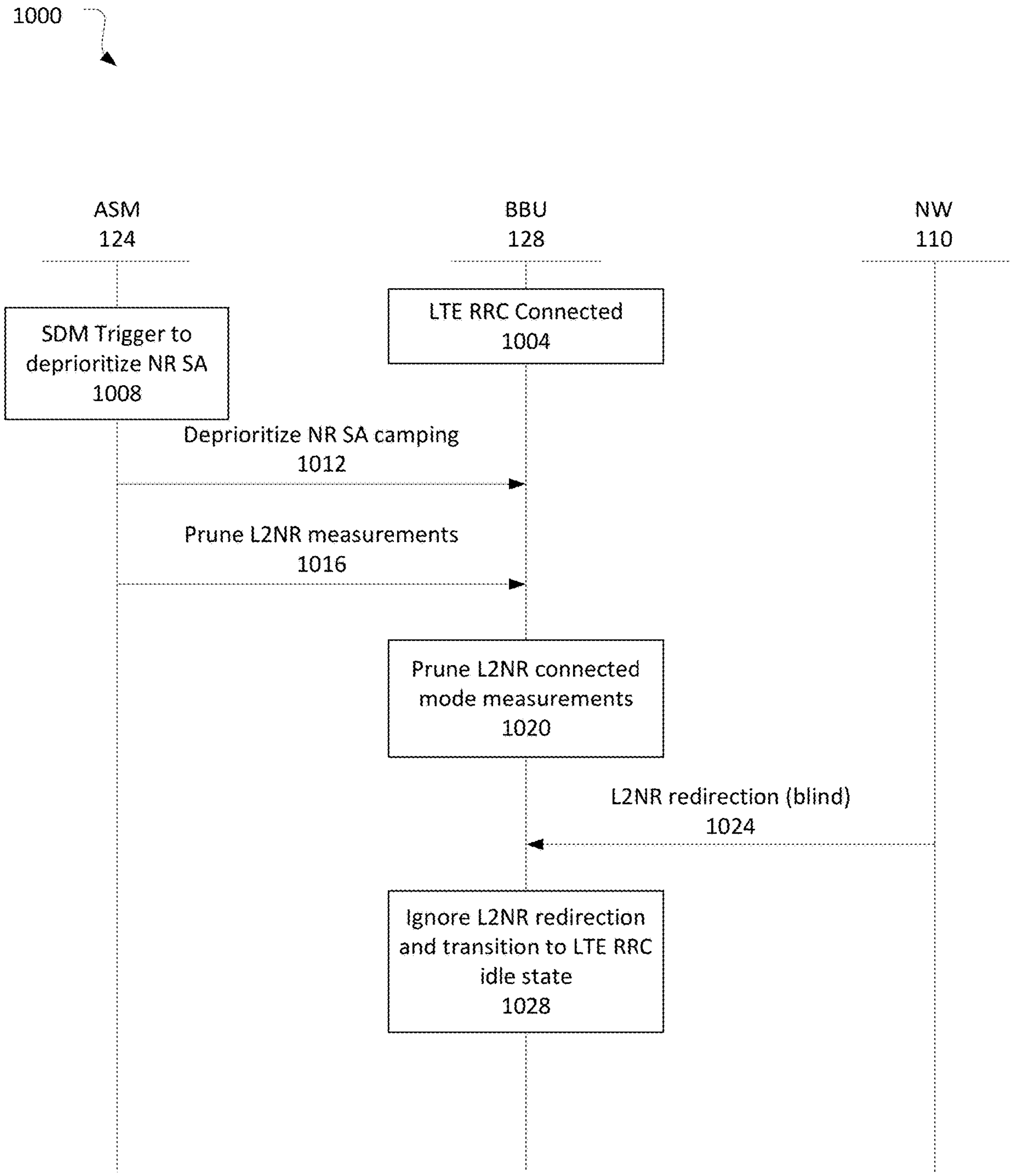
FIG. 10 illustrates another signaling diagram in accordance with some aspects.

FIG. 10 illustrates a signaling diagram 1000 in accordance with some embodiments. The signaling diagram 1000 describes the UE 104 detecting an SDM trigger to deprioritize NR SA camping while connected with an LTE cell.

At 1004, the BBU 128 may be operating in an LTE RRC connected state. For example, the UE 104 may be connected with an LTE cell provided by the eNB 112.

At 1008, the ASM 124 may detect the SDM trigger to deprioritize NR SA camping and may transmit, to the BBU 128, a signal to deprioritize NR SA camping at 1012.

In a typical operation, the NW 110 may configure the UE 104 with an L2NR measurement configuration. While camped on an LTE cell, the UE 104 may perform L2NR measurements in order to measure signal strength and other parameters with respect to a proximate NR cell based on the L2NR measurement configuration. This may be done in anticipation of an inter-RAT mobility handover from the LTE cell to the NR cell. However, once the ASM 124 detects the SDM trigger, the ASM 124 may institute a process to prune these configured measurements. Pruning these configured measurements may involve not performing the measurements, deleting any existing measurements, or not transmitting measurement reports based on the measurements.

Thus, at 1016, after detecting the SDM trigger, the ASM 124 may transmit, to the BBU 128, a signal to prune L2NR measurements. In some embodiments, the signaling at 1012 and 1016 may be combined. The BBU 128 may prune the L2NR connected mode measurements at 1020.

In some instances, the NW 110 may decide to perform a L2NR redirection. This redirection may be considered a blind L2NR redirection as it is not based on measurements provided by the UE 104. In the event that the BBU 128 receives the blind L2NR redirection at 1024, it may proceed to ignore the L2NR redirection command and, instead of transitioning to NR idle state, may transition to the LTE RRC idle state at 1028.

Figure 11:
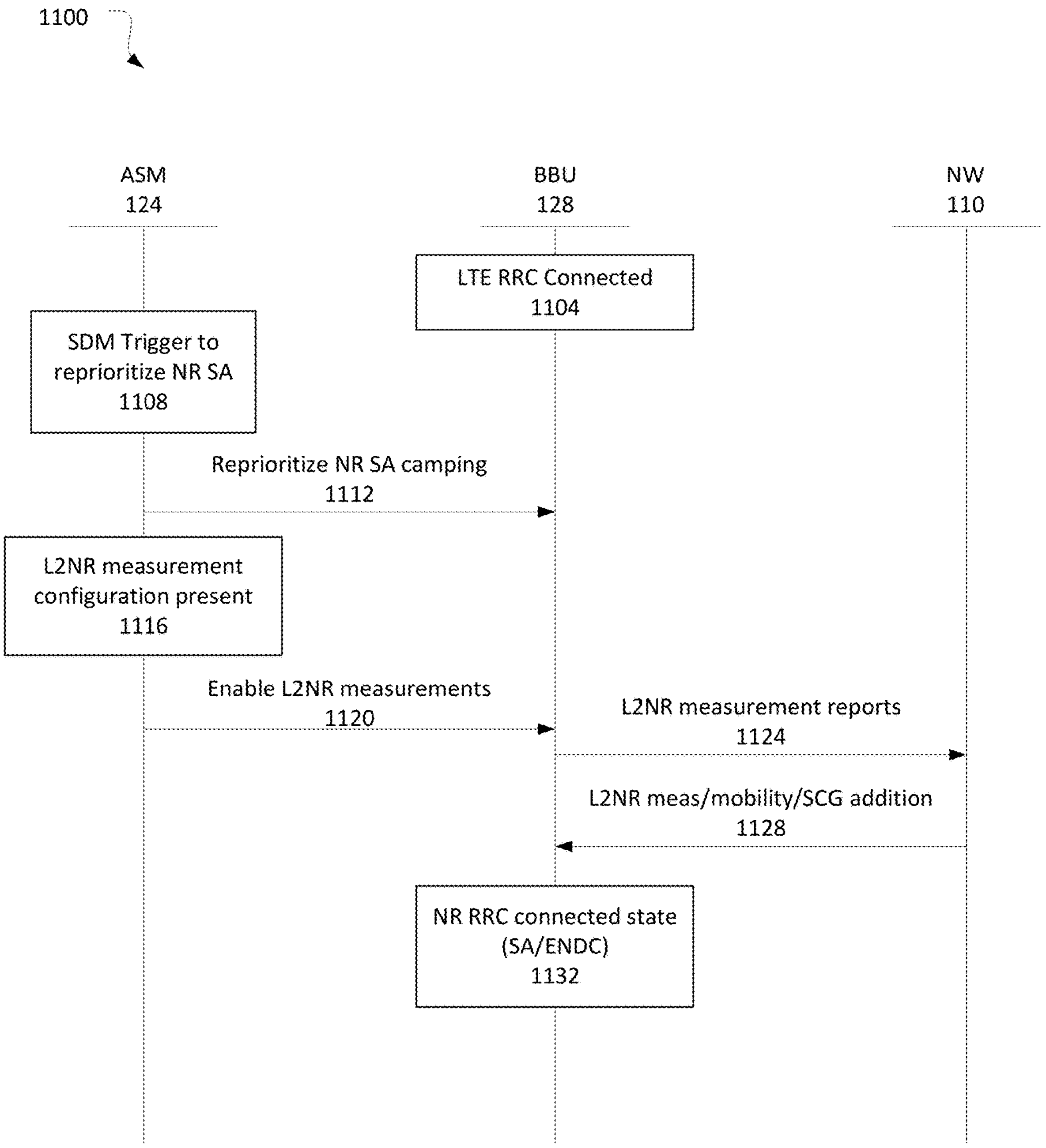
FIG. 11 illustrates another signaling diagram in accordance with some aspects.

FIG. 11 illustrates a signaling diagram 1100 in accordance with some embodiments. The signaling diagram 1100 describes the UE 104 detecting an SDM trigger to reprioritize NR SA camping while connected with an LTE cell.

At 1104, the BBU 128 may be operating in an LTE RRC connected state. For example, the UE 104 may be connected with an LTE cell provided by the eNB 112.

At 1108, the ASM 124 may detect the SDM trigger to reprioritize NR SA camping and may transmit, to the BBU 128, a signal to reprioritize NR SA camping at 1112.

At 1116, the ASM 124 may detect that an L2NR measurement configuration is present. For example, the NW 110 has configured the UE 104 to perform measurements with respect to an NR cell while the UE 104 is connected with an LTE cell.

At 1120, the ASM 124 may transmit, to the BBU 128, a signal to enable L2NR measurements. The BBU 128 may proceed to perform the measurements based on the L2NR measurement configuration and, at 1124, transmit L2NR measurement reports to the NW 110.

At 1128, the NW 110 may transmit L2NR measurement and mobility parameters or an instruction to add a secondary cell group (SCG). The SCG may be provided by the gNB 108 as part of an ENDC system.

At 1132, the BBU 128 may enter an NR RRC connected state. The NR RRC connected state may be with an SA NR cell, or may be with an NSA NR cell as part of an ENDC system.

Figure 12:
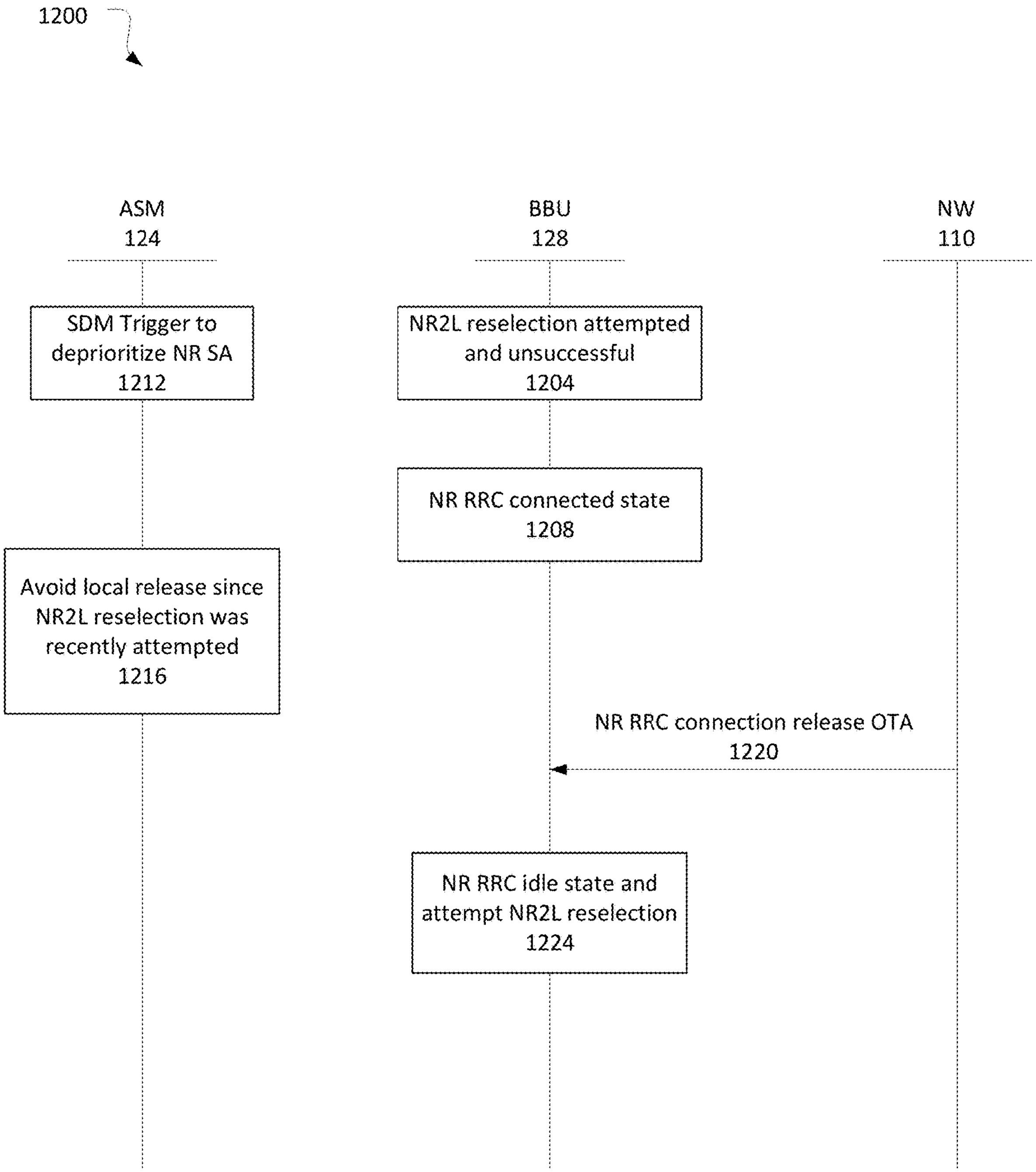
FIG. 12 illustrates another signaling diagram in accordance with some aspects.

FIG. 12 illustrates a signaling diagram 1200 in accordance with some embodiments. The signaling diagram 1200 describes the UE 104 detecting an SDM trigger to deprioritize NR SA camping while connected with an NR cell.

At 1204, the BBU 128 may have attempted an NR2L reselection and determined that the reselection attempt was unsuccessful. Thus, the BBU 128 may operate in an RRC connected state at 1208.

At 1212, the ASM 124 may detect the SDM trigger to deprioritize NR SA camping. Given that the NR2L reselection was recently attempted and unsuccessful, the ASM 124 may avoid performing a local release for a period of time at 1216. This may prevent wasting resources on repeated attempts at performing a local release and reselection. Instead, the UE 104 may wait for the connection to naturally expire. For example, at 1220, the BBU 128 may receive an NR RRC connection release over the air (OTA) from the NW 110.

At 1224, the BBU 128 may perform the NR RRC connection release to transition to the NR RRC idle state. At that time, the BBU 128 may attempt to perform the NR2L reselection.

Figure 13:
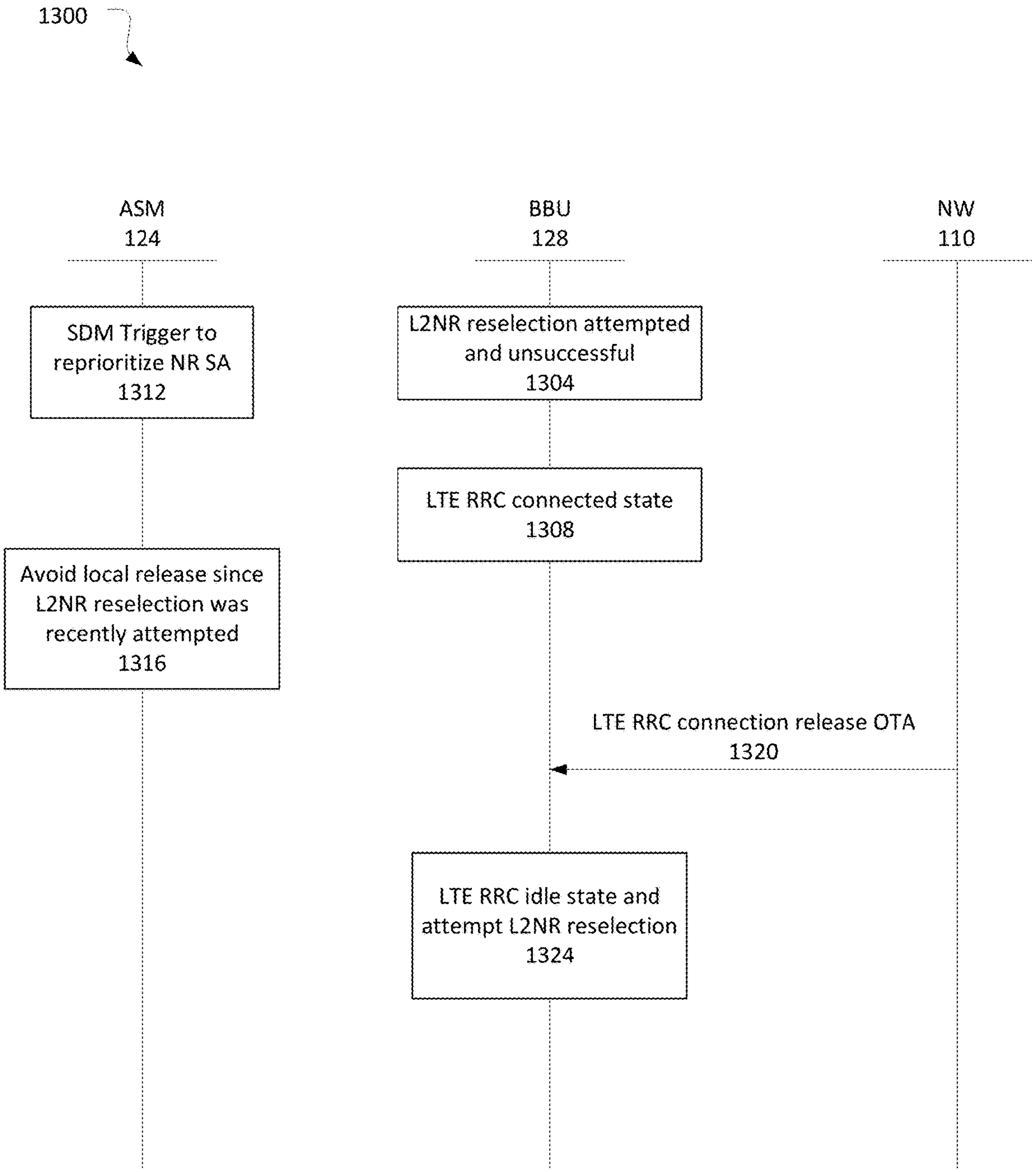
FIG. 13 illustrates another signaling diagram in accordance with some aspects.

FIG. 13 illustrates a signaling diagram 1300 in accordance with some embodiments. The signaling diagram 1300 describes the UE 104 detecting an SDM trigger to reprioritize NR SA camping while connected with an LTE cell.

At 1304, the BBU 128 may have attempted an L2NR reselection and determined that the reselection attempt was unsuccessful. Thus, the BBU 128 may operate in an LTE connected state at 1308.

At 1312, the ASM 124 may detect the SDM trigger to reprioritize NR SA camping. Given that the L2NR reselection was recently attempted and unsuccessful, the ASM 124 may avoid performing a local release for a period of time at 1316. This may prevent wasting resources on repeated attempts at performing a local release and reselection. Instead, the UE 104 may wait for the connection to naturally expire. For example, at 1320, the BBU 128 may receive an LTE RRC connection release OTA from the NW 110.

At 1324, the BBU 128 may perform the LTE RRC connection release to transition to the LTE RRC idle state. At that time, the BBU 128 may attempt to perform the L2NR reselection.

Figure 14:
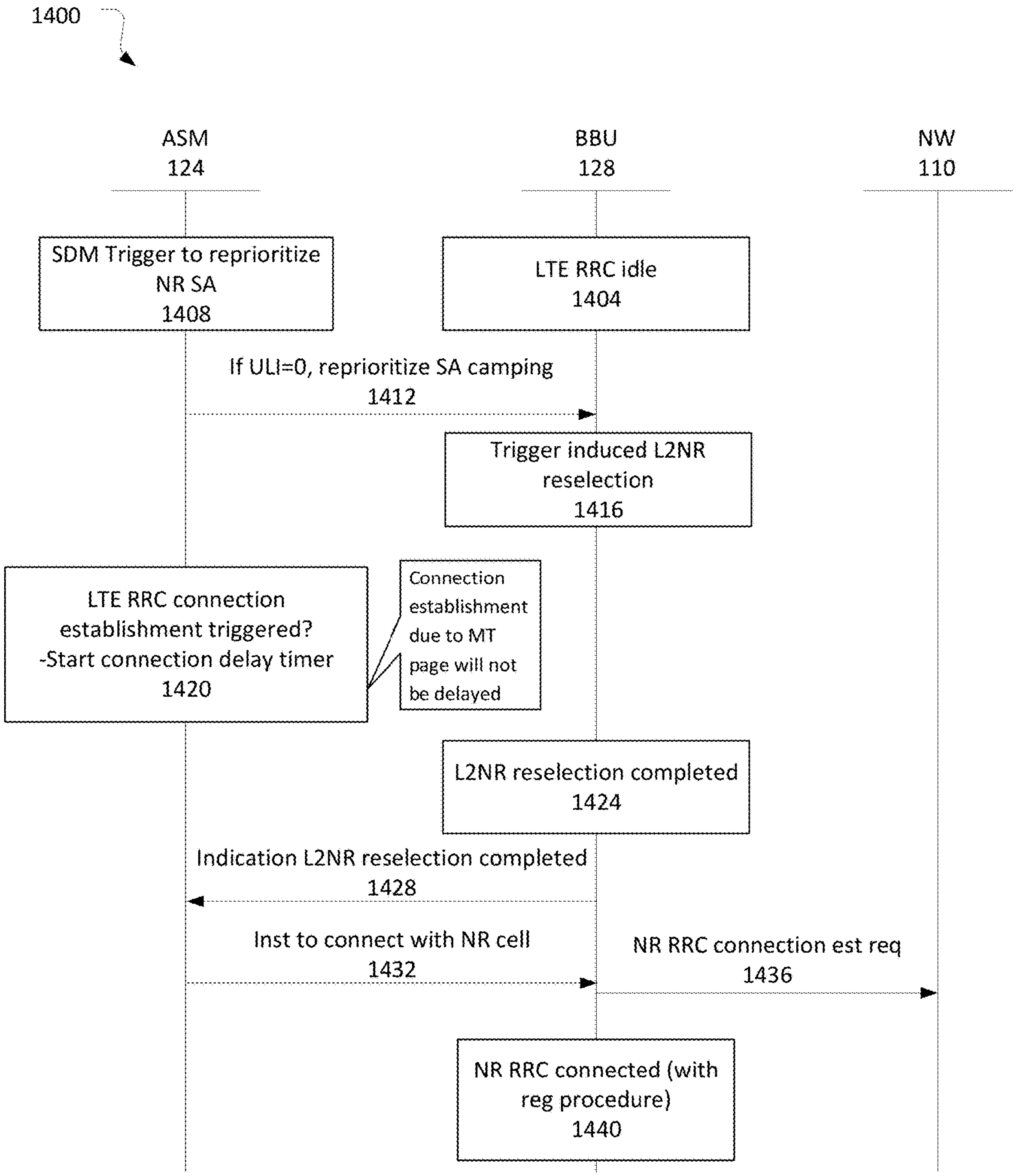
FIG. 14 illustrates another signaling diagram in accordance with some aspects.

FIG. 14 illustrates a signaling diagram 1400 in accordance with some embodiments. The signaling diagram 1400 describes the UE 104 detecting an SDM trigger to reprioritize NR SA camping while camping on an LTE cell.

At 1404, the BBU 128 may be operating in an LTE RRC idle state. For example, the UE 104 may be camped on an LTE cell provided by the eNB 112.

At 1408, the ASM 124 may detect the SDM trigger to reprioritize NR SA camping.

At 1412, the ASM 124 may determine whether an upper layer indication (ULI) that is included in a SIB 2 transmission from the NW 110 is set to zero. If the ULI is set to one, the gNB 108 may support an NSA deployment (for example, ENDC in which the LTE may serve as an anchor cell and the NR cell may support an SCG). If the gNB 108 supports NSA deployment, the L2NR reselection may not need to be triggered. Instead, the UE 104 may continue to camp on the LTE anchor cell. If, however, the ULI is set to zero, the gNB 108 may not support NSA deployment (for example, it may only support NR SA), then the ASM 124 may transmit the signal at 1412 to reprioritize NR SA camping. The BBU 128 may then trigger the induced L2NR reselection at 1416.

At 1420, the ASM 124 may detect a trigger event that compels establishment of an LTE RRC connection. In the event the L2NR reselection is not yet completed, the ASM 124 may start a connection delay timer upon detecting the LTE RRC connection trigger.

At 1424, the BBU 128 may determine that the L2NR reselection has completed and transmit a corresponding indication to the ASM 124 at 1428. In other embodiments, the ASM 124 may determine whether the L2NR reselection is complete based on a status of a register or some other indication.

Upon determining that the L2NR reselection is complete and the connection delay timer has not yet expired, the ASM 124 may, at 1432, transmit an instruction to the BBU 128 to connect with the NR cell.

At 1436, the BBU 128 may transmit an NR RRC connection establishment request to the gNB 108 of the NW 110.

At 1440, the RRC state machine of the BBU 128 may enter an NR RRC connected state. In some embodiments, a registration procedure may be performed as part of, or after, transitioning to the NR RRC connected state.

As discussed above with respect to FIG. 4, the LTE RRC connection establishment may be triggered based on the UE 104 having data to send to the NW 110. However, an LTE RRC connection establishment may also be triggered based on a mobile terminal (MT) page. In the event the LTE RRC connection establishment is triggered based on an MT page, the UE 104 may not know if the connection is requested for data or voice. As discussed above, the reselection process may be avoided in the event that connection is for voice or emergency services (for example, an e911 call). Thus, in some embodiments, if the LTE RRC connection establishment is triggered based on an MT page, the ASM 124 may not delay the connection establishment. Instead, the ASM 124 may, upon detecting the trigger at 1420, provide the instructions to the BBU 128 to connect without delay. If the reselection has completed, the instruction may be to connect to the NR cell. If the reselection has not completed, the instruction may be to connect to the LTE cell.

Figure 15:
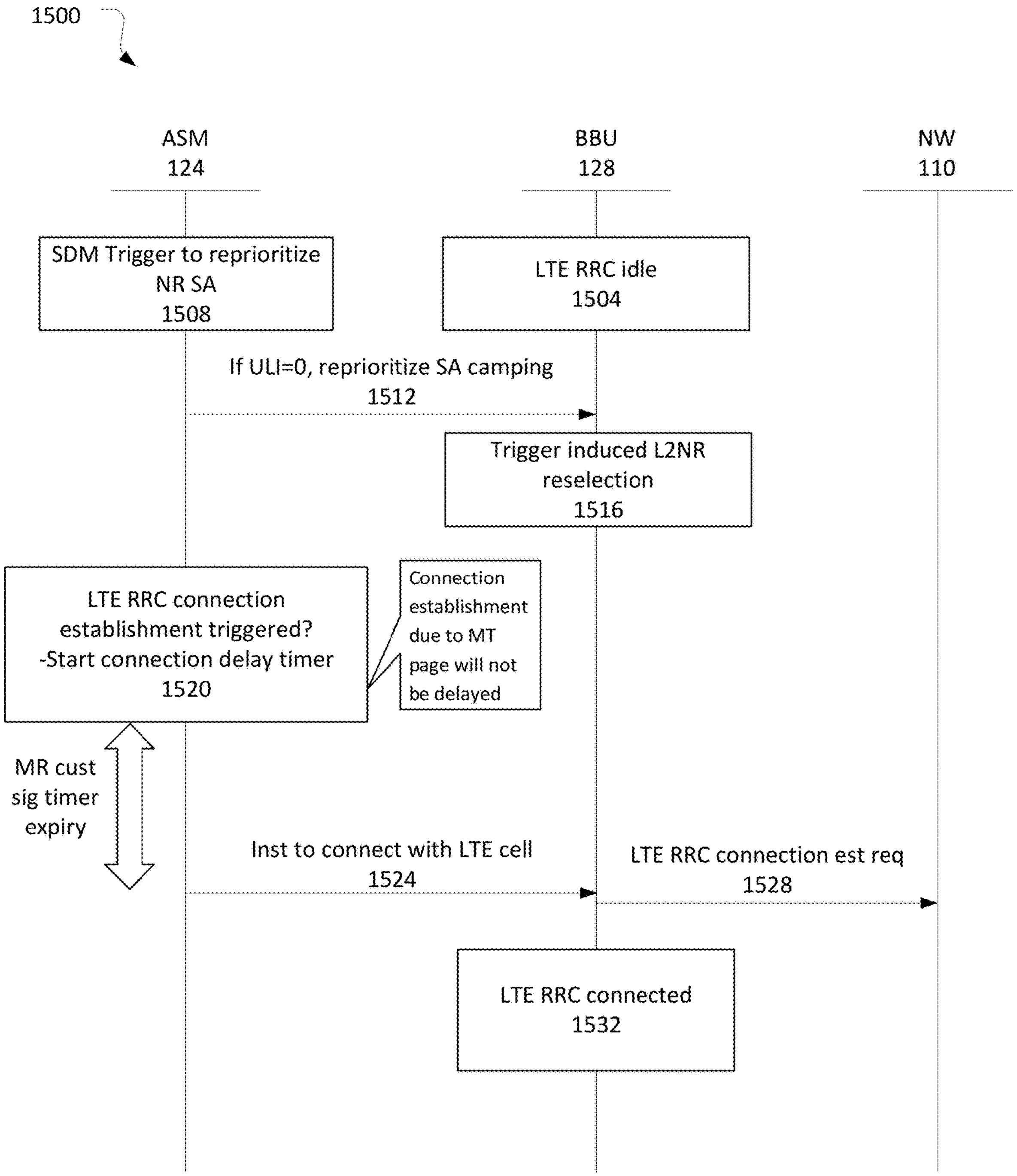
FIG. 15 illustrates another signaling diagram in accordance with some aspects.

FIG. 15 illustrates a signaling diagram 1500 in accordance with some embodiments. The signaling diagram 1500 describes the UE 104 detecting an SDM trigger to reprioritize NR SA camping while camping on an LTE cell.

Operations 1504, 1508, 1512, 1516, and 1520 may be similar to corresponding operations described above with respect to FIG. 14.

In contrast to signaling diagram 1400, in signaling diagram 1500, the L2NR reselection process may not be completed before timer expiry. Upon expiration of the connection delay timer, the ASM 124 may transmit, to the BBU 128, an instruction to connect with the LTE cell at 1524. The BBU 128 may then, at 1528, transmit an LTE RRC connection establishment request to the eNB 112 of the NW 110.

At 1532, the RRC state machine of the BBU 128 may enter an LTE RRC connected state.

Similar to that described above with respect to FIG. 14, the connection establishment procedure may not be delayed (at 1516) if the connection establishment is due to an MT page. Instead, the ASM 124 may, upon detecting the trigger at 1520, provide the instructions to the BBU 128 to connect without delay.

Figure 16:
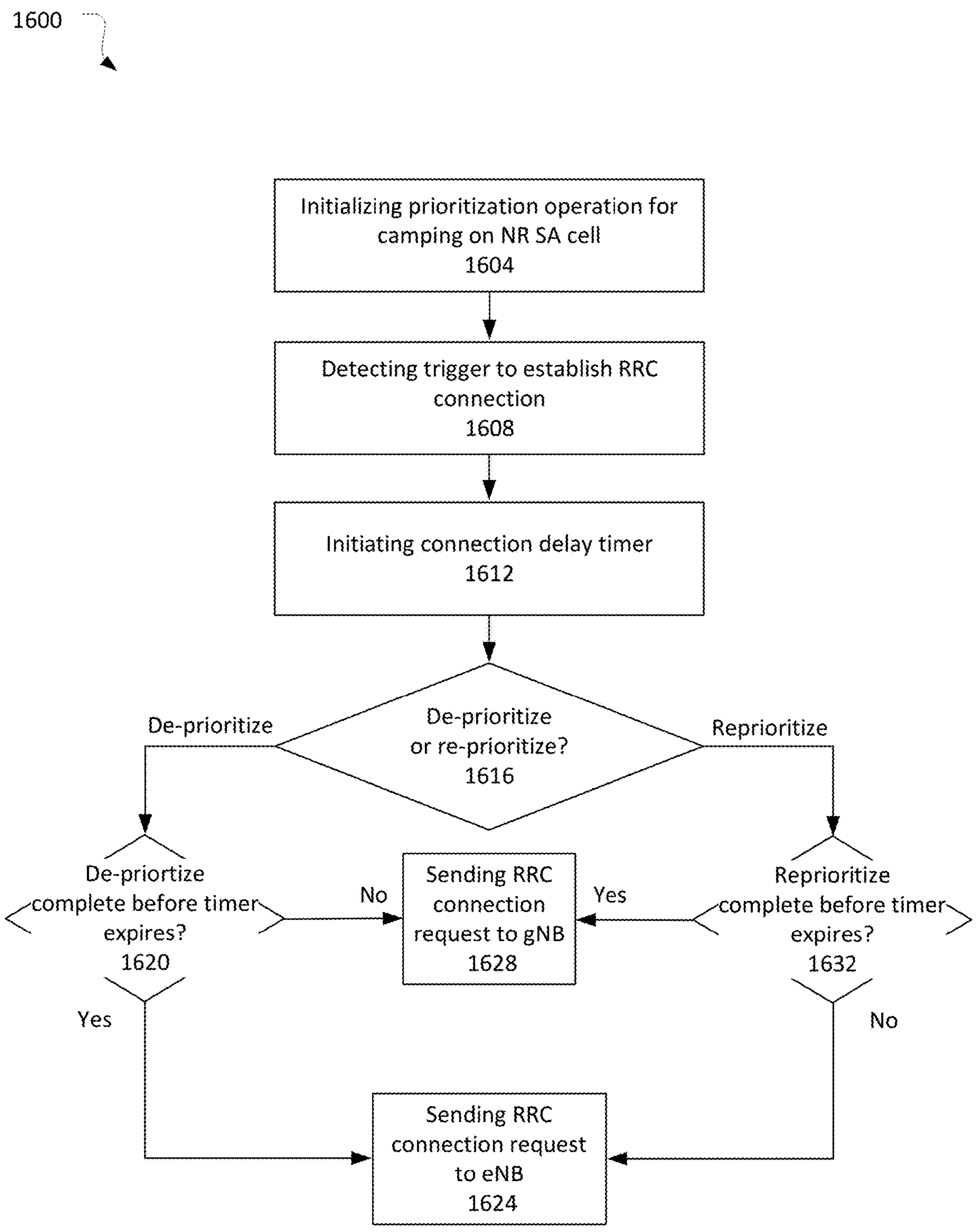
FIG. 16 illustrates an operational flow/algorithmic structure in accordance with some aspects.

FIG. 16 illustrates an operation flow/algorithmic structure 1600 in accordance with some aspects. The operation flow/algorithmic structure 1600 may be performed or implemented by a UE such as, for example, UE 104 or 2100; or components thereof, for example, baseband processor 2104A.

The operation flow/algorithmic structure 1600 may include, at 1604, initializing a prioritization operation for camping on an NR SA cell. The prioritization operation may be based on an SDM trigger that is received from higher layers (for example, an OS) of the implementing UE. The prioritization operation may deprioritize camping on an NR SA cell; or reprioritize camping on an NR SA cell.

The operation flow/algorithmic structure 1600 may further include, at 1608, detecting a trigger to establish an RRC connection. The trigger may be based on the implementing UE having data that is to be sent to a network.

The operation flow/algorithmic structure 1600 may further include, at 1612, initiating a connection delay timer. The connection delay timer may be initiated to allow a reprioritization operation to complete, but may also provide assurance that connection will proceed in the event the reprioritization operation does not complete in a timely manner.

The operation flow/algorithmic structure 1600 may further include, at 1616, determining whether the prioritization operation is to deprioritize NR SA camping or reprioritize NR SA camping.

If the prioritization operation deprioritizes NR SA camping, the operation flow/algorithmic structure 1600 may advance to determining whether the deprioritization operation completes before the connection delay timer expires at 1620.

If the deprioritization completes before the timer expires, the operation flow/algorithmic structure 1600 may advance to sending an RRC connection request to an eNB at 1624. In this case, the UE may have successfully re-camped on the LTE cell in time for the RRC connection to be established with the eNB.

If the deprioritization does not complete before the timer expires, the operation flow/algorithmic structure 1600 may advance to sending an RRC connection request to a gNB at 1628. In this case, the UE may not have successfully re-camped on the LTE cell in time for the RRC connection to be established with the eNB. Instead, to prevent further delay in the transmission of the data that is to be sent by the RRC connection, the UE may proceed with the connection to the gNB.

If, at 1616, it is determined that the prioritization operation reprioritizes NR SA camping, the operation flow/algorithmic structure 1600 may advance to determining whether the reprioritization operation completes before the connection delay timer expires at 1632.

If the reprioritization completes before the timer expires, the operation flow/algorithmic structure 1600 may advance to sending the RRC connection request to the gNB at 1628. In this case, the UE may have successfully re-camped on the NR cell in time for the RRC connection to be established with the gNB.

If the reprioritization does not complete before the timer expires, the operation flow/algorithmic structure 1600 may advance to sending an RRC connection request to the eNB at 1624. In this case, the UE may not have successfully re-camped on the NR cell in time for the RRC connection to be established with the gNB. Instead, to prevent further delay in the transmission of the data that is to be sent by the RRC connection, the UE may proceed with the connection to the eNB.

Figure 17:
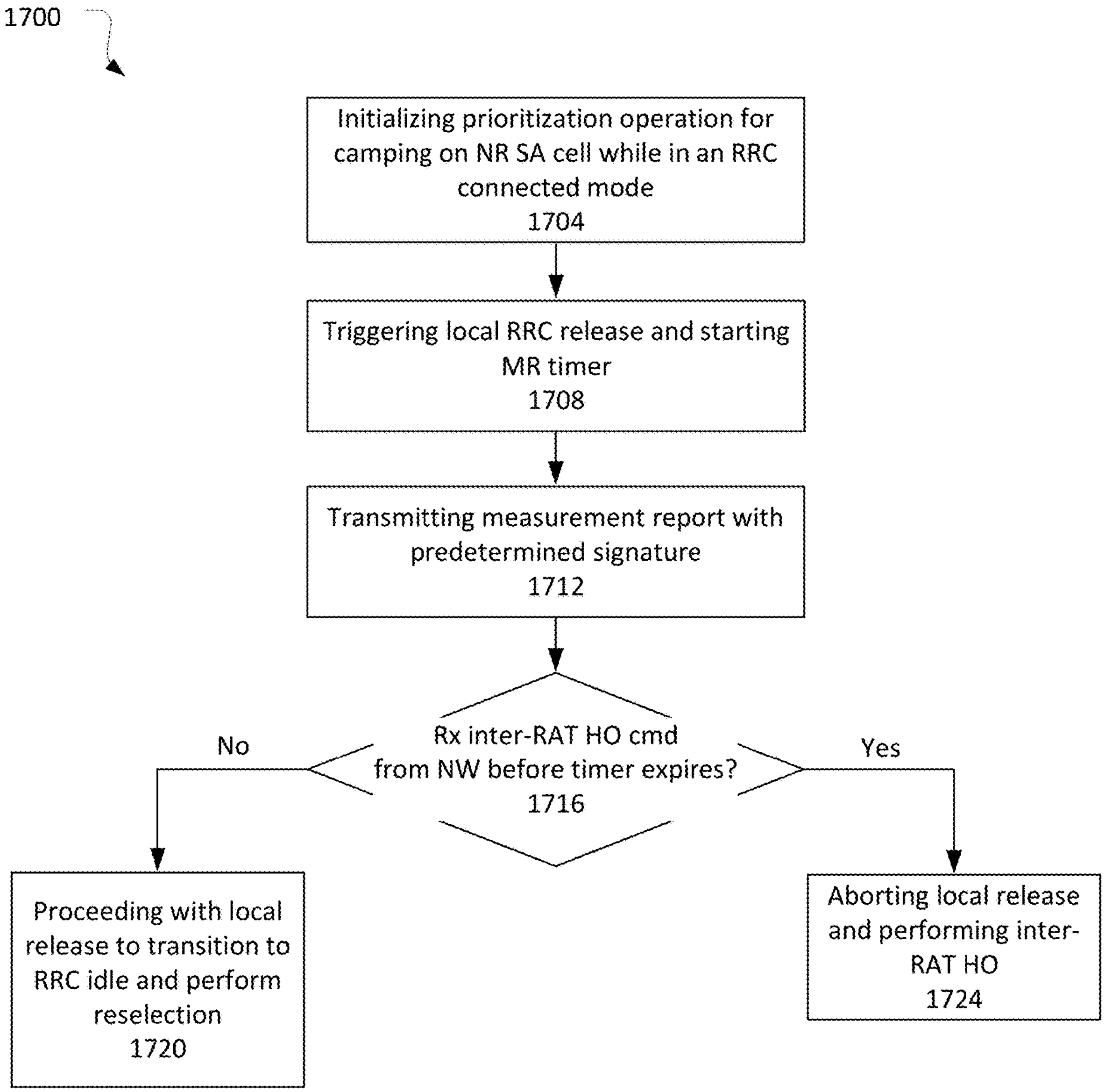
FIG. 17 illustrates another operational flow/algorithmic structure in accordance with some aspects.

FIG. 17 illustrates an operation flow/algorithmic structure 1700 in accordance with some aspects. The operation flow/algorithmic structure 1700 may be performed or implemented by a UE such as, for example, UE 104 or 2100; or components thereof, for example, baseband processor 2104A.

The operation flow/algorithmic structure 1700 may include, at 1704, initializing a prioritization operation for camping on an NR SA cell while in an RRC connected state. The RRC connected state may be with an NR cell or an LTE cell.

The operation flow/algorithmic structure 1700 may further include, at 1708, triggering a local RRC release and starting an MR timer. The local RRC release may be triggered to transition the UE from a connected state to an idle state so that the UE may perform the reselection based on the prioritization operation.

The operation flow/algorithmic structure 1700 may further include, at 1712, transmitting a measurement report with a predetermined signature. The predetermined signature, which may also be referred to as a custom signature, may be a signature that both the UE and network recognized as indicating that the UE is performing a prioritization operation and requests support from the network to do so. The support from the network may include providing measurement and mobility parameters in an inter-RAT handover command; ignoring KPIs affected by a local release; or ensuring that no state machine mismatch occurs due to the measurement report with predetermined signature.

The operation flow/algorithmic structure 1700 may further include, at 1716, determining whether an inter-RAT handover command is received from the network before the MR timer expires.

If no handover command is received before the timer expires, the operation flow/algorithmic structure may advance to proceeding with the local release to transition to RRC idle and perform the reselection at 1720. In this case, the network may either be delayed in providing the handover command or may provide a lower-level of support to the prioritization operation performed by the UE.

If the handover command is received before the timer expires, the operation flow/algorithmic structure may advance to aborting the local release and performing the inter-RAT handover as instructed by the handover command at 1724.

Figure 18:
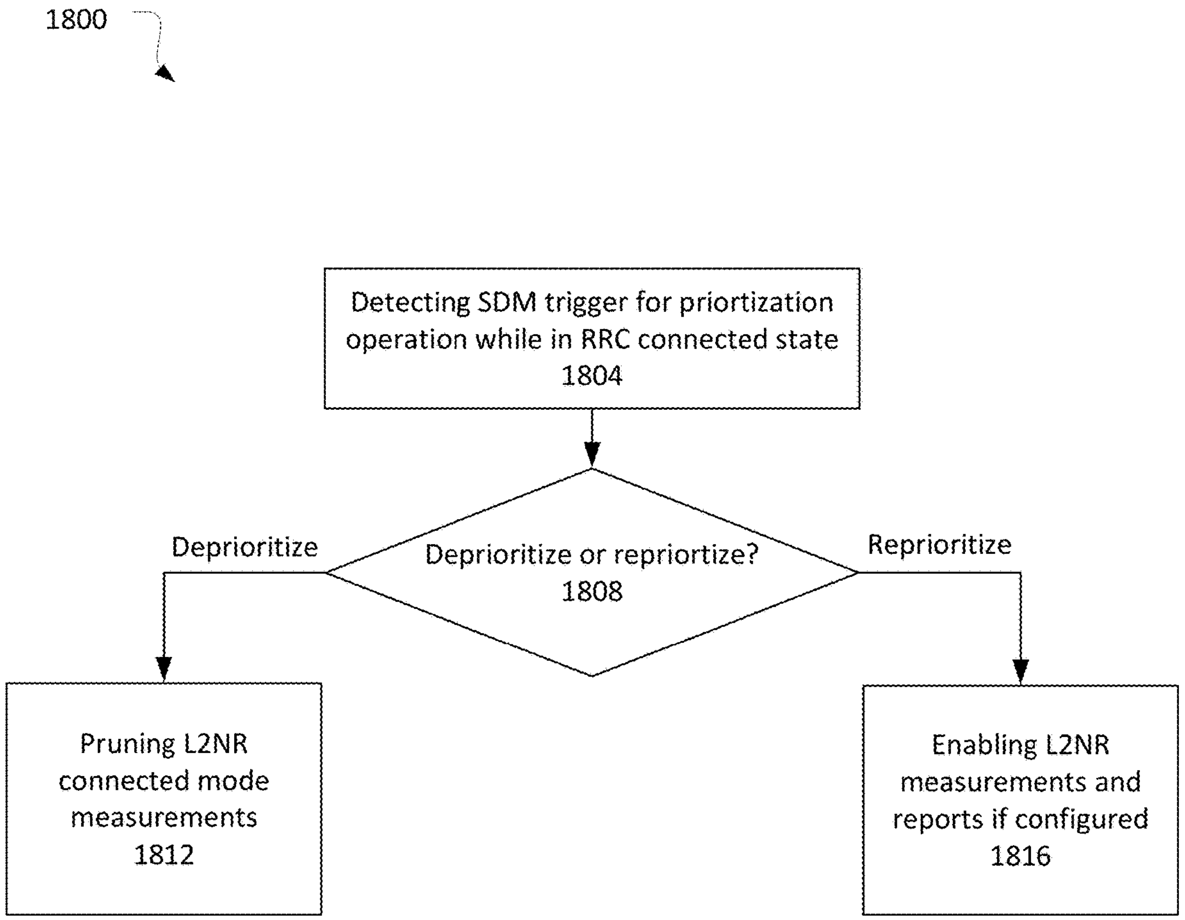
FIG. 18 illustrates another operational flow/algorithmic structure in accordance with some aspects.

FIG. 18 illustrates an operation flow/algorithmic structure 1800 in accordance with some aspects. The operation flow/algorithmic structure 1800 may be performed or implemented by a UE such as, for example, UE 104 or 2100; or components thereof, for example, baseband processor 2104A.

The operation flow/algorithmic structure 1800 may include, at 1804, detecting an SDM trigger for a prioritization operation while in an RRC connected state. The RRC connected state may be with an NR cell or an LTE cell.

The operation flow/algorithmic structure 1800 may further include, at 1808, determining whether the prioritization operation deprioritizes NR SA camping or reprioritizes NR SA camping.

If the prioritization operation deprioritizes NR SA camping, the operation flow/algorithmic structure 1800 may advance to pruning L2NR connected mode measurements at 1812. These connected mode measurements may be configured by the network such that a UE connected with an LTE cell will perform measurements on a proximate NR cell for possible handover. By pruning these connected mode measurements, the UE may no longer perform the measurements and reports based on a measurement configuration provided by a network. Given that camping on the NR SA cell is deprioritized, pruning of these measurements/reports may save energy and prevent an undesired command from the network to handover services from the LTE cell to the NR cell. In some embodiments, if the network does provide a handover command, the UE may ignore the command.

If the prioritization operation reprioritizes NR SA camping, the operation flow/algorithmic structure 1800 may advance to enabling L2NR connected mode measurements at 1816. By enabling these connected mode measurements, the UE may perform measurements and reports based on the measurement configuration provided by a network. In this instance, the UE may seek a handover to a proximate NR cell that provides desired service capabilities.

Figure 19:
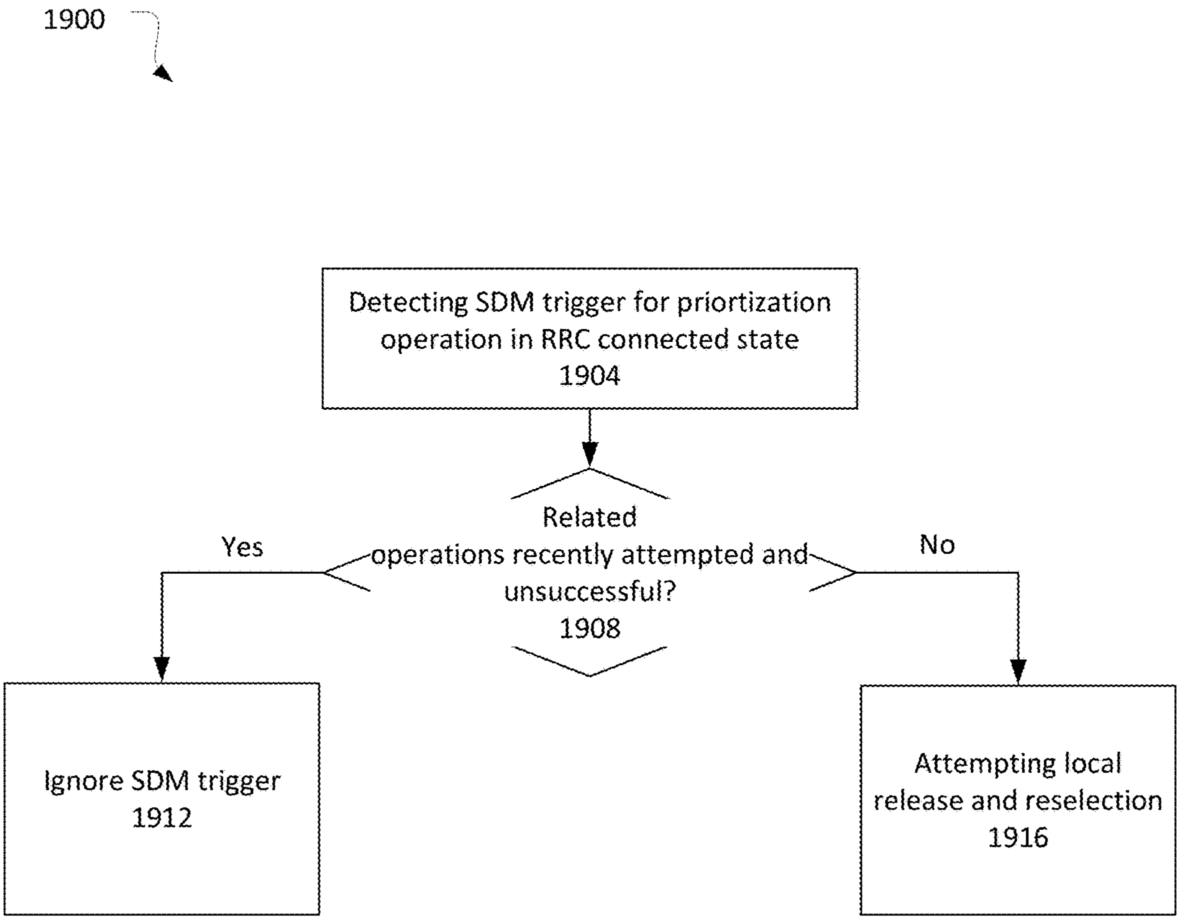
FIG. 19 illustrates another operational flow/algorithmic structure in accordance with some aspects.

FIG. 19 illustrates an operation flow/algorithmic structure 1900 in accordance with some aspects. The operation flow/algorithmic structure 1900 may be performed or implemented by a UE such as, for example, UE 104 or 2100; or components thereof, for example, baseband processor 2104A.

The operation flow/algorithmic structure 1900 may include, at 1904, detecting an SDM trigger for a prioritization operation while in an RRC connected state. The RRC connected state may be with an NR cell or an LTE cell.

The operation flow/algorithmic structure 1900 may further include, at 1908, determining whether there have been recent unsuccessful attempts to perform operations related to a prioritization operation. The related operations may include local RRC release and reselection. In some embodiments, the temporal relativity of unsuccessful attempts may be based on a predetermined or otherwise preconfigured period of time. For example, it may be determined that any unsuccessful attempt to perform related operations, within X seconds prior to determination at 1908, may be considered recent, where X is a value that is predetermined or otherwise preconfigured.

If it is determined that an attempt to perform the related operations was recently unsuccessful, the operation flow/algorithmic structure 1900 may advance to ignoring the SDM trigger at 1912. In this instance, the UE may wait for the natural expiration of the connection to transition to the idle state. At that time, the UE may perform reselection if desired.

If it is determined that an unsuccessful attempt to perform the related operations did not occur recently, the operation flow/algorithmic structure 1900 may advance to attempting a local release and reselection at 1916.

Figure 20:
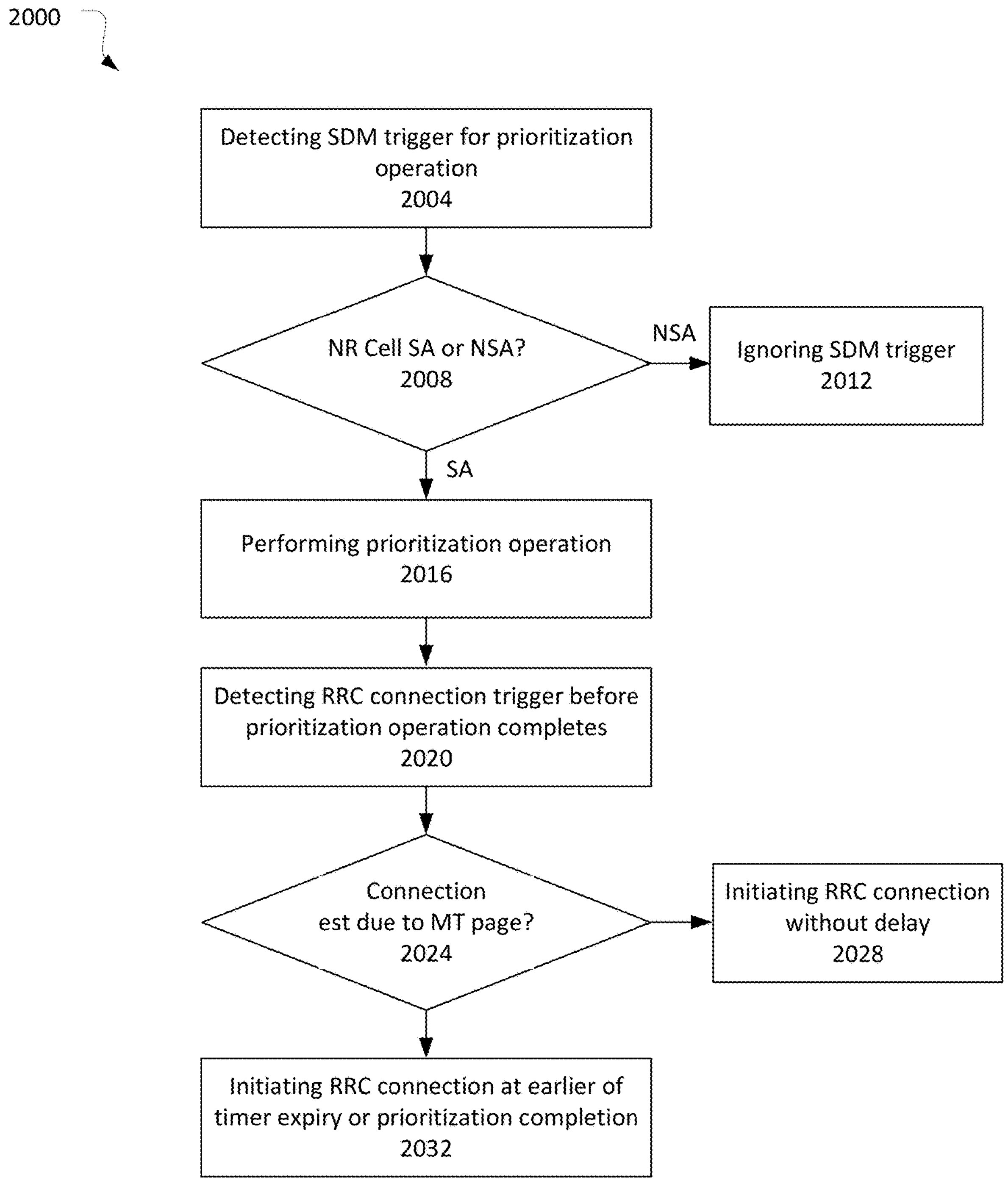
FIG. 20 illustrates another operational flow/algorithmic structure in accordance with some aspects.

FIG. 20 illustrates an operation flow/algorithmic structure 2000 in accordance with some aspects. The operation flow/algorithmic structure 2000 may be performed or implemented by a UE such as, for example, UE 104 or 2100; or components thereof, for example, baseband processor 2104A.

The operation flow/algorithmic structure 2000 may include, at 2004, detecting an SDM trigger for a prioritization operation while in an RRC idle state. The UE may be camped on an NR cell.

The operation flow/algorithmic structure 2000 may further include, at 2008, determining whether a proximate NR cell is an SA cell or an NSA cell. The determination at 2008 may be based on a network transmission from the NR cell. The network transmission may be a SIB2 transmission having a ULI that provides information related to whether the NR cell is an SA cell or an NSA cell. For example, if the ULE is set to zero, the NR cell may be an SA cell that does not support ENDC. If the ULI is set to one, the NR cell may be an NSA cell that supports ENDC.

If it is determined, at 2008, that the NR cell is an NSA cell, the operation flow/algorithmic structure 2000 may advance to ignoring the SDM trigger at 2012.

If it is determined, at 2008, that the NR cell is an SA cell, the operation flow/algorithmic structure 2000 may advance to performing the prioritization operation at 2016. The prioritization operation may be an operation to deprioritize NR SA camping.

The operation flow/algorithmic structure 2000 may include, at 2020, detecting an RRC connection trigger before the prioritization operation completes.

The operation flow/algorithmic structure 2000 may further include, at 2024, determining whether the connection is to be established due to an MT page. If the connection is to be established based on an MT page, the operation flow/algorithmic structure 2000 may advance to initiating the RRC connection without delay at 2028. If the connection is based on something other than an MT page, the operation flow/algorithmic structure 2000 may advance to initiating the RRC connection at the earlier of a connection delay timer expiry or completion of the prioritization operation at 2032.

Figure 21:
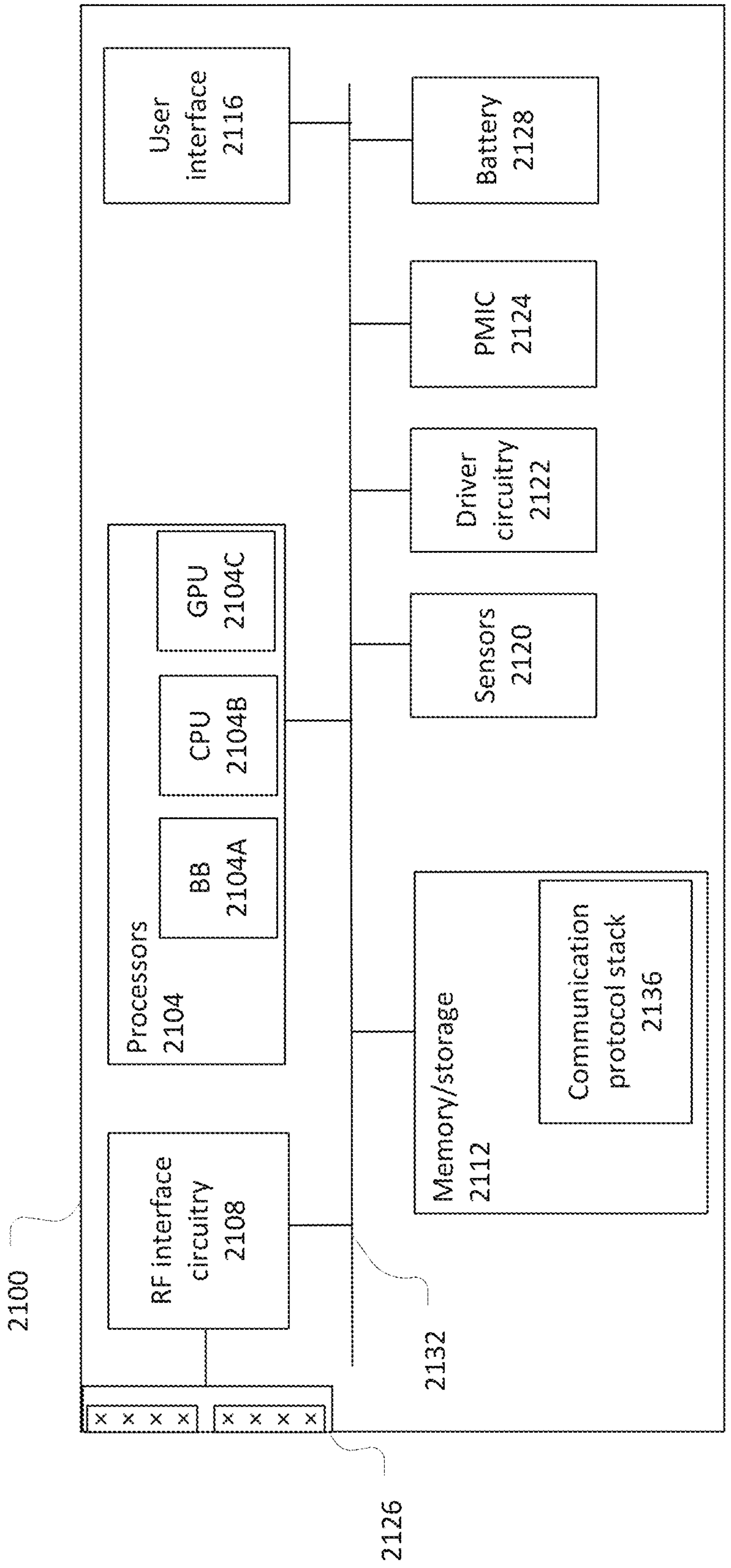
FIG. 21 illustrates a user equipment in accordance with some aspects.

FIG. 21 illustrates a UE 2100 in accordance with some aspects. The UE 2100 may be similar to and substantially interchangeable with UE 104.

The UE 2100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 2100 may include processors 2104, RF interface circuitry 2108, memory/storage 2112, user interface 2116, sensors 2120, driver circuitry 2122, power management integrated circuit (PMIC) 2124, antenna structure 2126, and battery 2128. The components of the UE 2100 may be implemented as integrated circuits (ICs), portions thereof, discrete electronic devices, or other modules, logic, hardware, software, firmware, or a combination thereof. The block diagram of FIG. 21 is intended to show a high-level view of some of the components of the UE 2100. However, some of the components shown may be omitted, additional components may be present, and different arrangement of the components shown may occur in other implementations.

The components of the UE 2100 may be coupled with various other components over one or more interconnects 2132, which may represent any type of interface, input/output, bus (local, system, or expansion), transmission line, trace, optical connection, etc. that allows various circuit components (on common or different chips or chipsets) to interact with one another.

The processors 2104 may include processor circuitry such as, for example, baseband processor circuitry (BB) 2104A, central processor unit circuitry (CPU) 2104B, and graphics processor unit circuitry (GPU) 2104C. The processors 2104 may include any type of circuitry or processor circuitry that executes or otherwise operates computer-executable instructions, such as program code, software modules, or functional processes from memory/storage 2112 to cause the UE 2100 to perform operations as described herein.

In some aspects, the baseband processor circuitry 2104A may access a communication protocol stack 2136 in the memory/storage 2112 to communicate over a 3GPP compatible network. In general, the baseband processor circuitry 2104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 2108.

The baseband processor circuitry 2104A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 2112 may include one or more non-transitory, computer-readable media that includes instructions (for example, communication protocol stack 2136) that may be executed by one or more of the processors 2104 to cause the UE 2100 to perform various operations described herein. The memory/storage 2112 may also store information related to prioritization operations and measurement configurations as described elsewhere.

The memory/storage 2112 include any type of volatile or non-volatile memory that may be distributed throughout the UE 2100. In some aspects, some of the memory/storage 2112 may be located on the processors 2104 themselves (for example, L1 and L2 cache), while other memory/storage 2112 is external to the processors 2104 but accessible thereto via a memory interface. The memory/storage 2112 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 2108 may include transceiver circuitry and radio frequency front module (RFEM) that allows the UE 2100 to communicate with other devices over a radio access network. The RF interface circuitry 2108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2126 and proceed to filter and amplify (with a low-noise amplifier) the signal. The signal may be provided to a receiver of the transceiver that down-converts the RF signal into a baseband signal that is provided to the baseband processor of the processors 2104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2126.

In various aspects, the RF interface circuitry 2108 may be configured to transmit/receive signals in a manner compatible with NR access technologies.

The antenna 2126 may include antenna elements to convert electrical signals into radio waves to travel through the air and to convert received radio waves into electrical signals. The antenna elements may be arranged into one or more antenna panels. The antenna 2126 may have antenna panels that are omnidirectional, directional, or a combination thereof to enable beamforming and multiple input, multiple output communications. The antenna 2126 may include microstrip antennas, printed antennas fabricated on the surface of one or more printed circuit boards, patch antennas, phased array antennas, etc. The antenna 2126 may have one or more panels designed for specific frequency bands including bands in frequency ranges 1 and 2.

The user interface circuitry 2116 includes various input/output (I/O) devices designed to enable user interaction with the UE 2100. The user interface 2116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 2100.

The sensors 2120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2122 may include software and hardware elements that operate to control particular devices that are embedded in the UE 2100, attached to the UE 1100, or otherwise communicatively coupled with the UE 2100. The driver circuitry 2122 may include individual drivers allowing other components to interact with or control various input/output (I/O) devices that may be present within, or connected to, the UE 2100. For example, driver circuitry 2122 may include a display driver to control and allow access to a display device, a touchscreen driver to control and allow access to a touchscreen interface, sensor drivers to obtain sensor readings of sensor circuitry 2120 and control and allow access to sensor circuitry 2120, drivers to obtain actuator positions of electro-mechanic components or control and allow access to the electro-mechanic components, a camera driver to control and allow access to an embedded image capture device, audio drivers to control and allow access to one or more audio devices.

The PMIC 2124 may manage power provided to various components of the UE 2100. In particular, with respect to the processors 2104, the PMIC 2124 may control power-source selection, voltage scaling, battery charging, or DC-to-DC conversion.

A battery 2128 may power the UE 2100, although in some examples the UE 2100 may be mounted deployed in a fixed location, and may have a power supply coupled to an electrical grid. The battery 2128 may be a lithium ion battery, a metal-air battery, such as a zinc-air battery, an aluminum-air battery, a lithium-air battery, and the like. In some implementations, such as in vehicle-based applications, the battery 2128 may be a typical lead-acid automotive battery.

Figure 22:
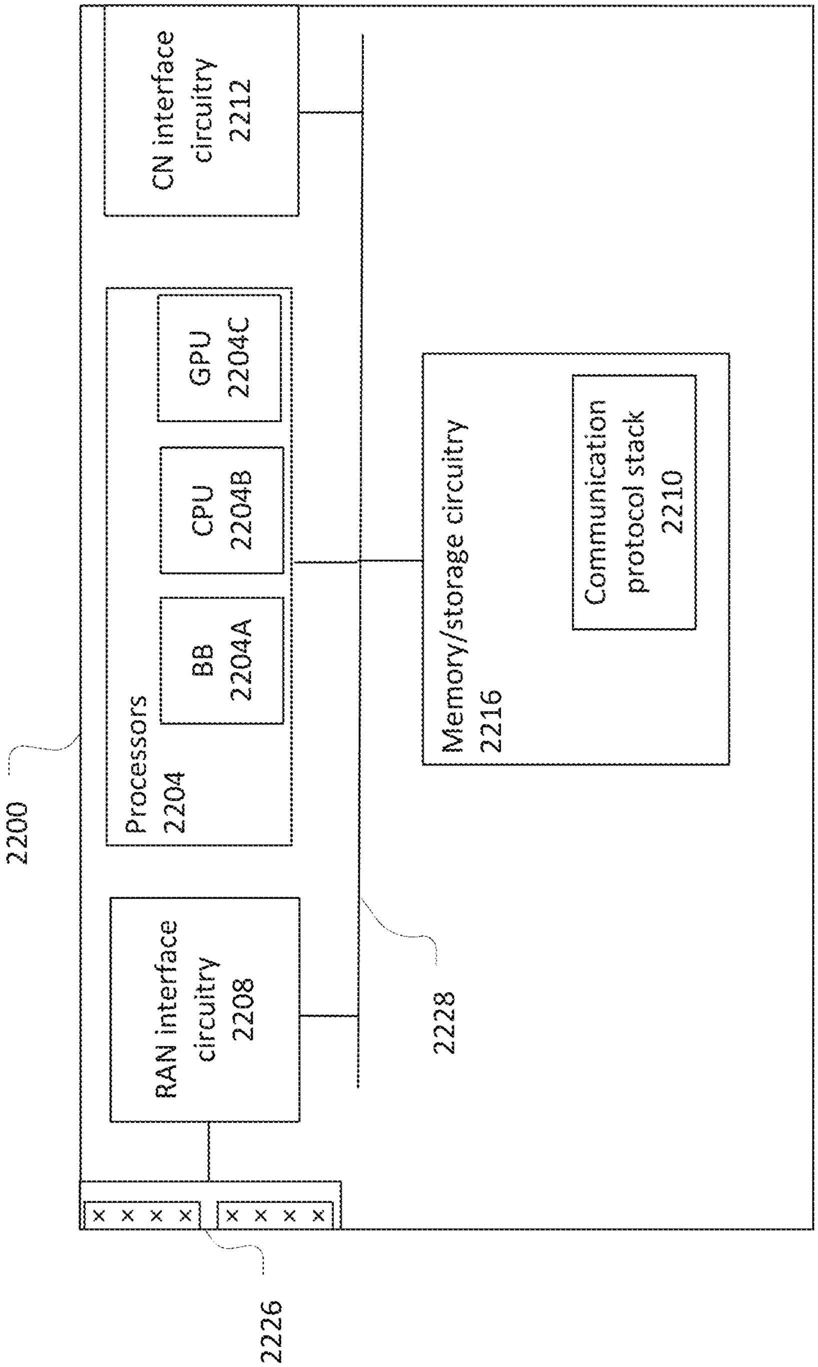
FIG. 22 illustrates a base station in accordance with some aspects.

FIG. 22 illustrates a base station 2200 in accordance with some aspects. The base station 2200 may similar to and substantially interchangeable with gNB 108 or eNB 112.

The base station 2200 may include processors 2204, RF interface circuitry 2208, core network (CN) interface circuitry 2212, memory/storage circuitry 2216, and antenna structure 2226.

The components of the base station 2200 may be coupled with various other components over one or more interconnects 2228.

The processors 2204, RF interface circuitry 2208, memory/storage circuitry 2216 (including communication protocol stack 2210), antenna structure 2226, and interconnects 2228 may be similar to like-named elements shown and described with respect to FIG. 21.

The CN interface circuitry 2212 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 2200 via a fiber optic or wireless backhaul. The CN interface circuitry 2212 may include one or more dedicated processors or FPGAs to communicate using one or more of the aforementioned protocols. In some implementations, the CN interface circuitry 2212 may include multiple controllers to provide connectivity to other networks using the same or different protocols.

In some aspects, the base station 2200 may be coupled with transmit receive points (TRPs) using the antenna structure 2226, CN interface circuitry, or other interface circuitry.

The components of the base station, for example, BB 2204A and communication protocol stack 2210 may perform various operations described herein including, for example, providing various levels of support to a UE performing a prioritization operation. This may be based on the receipt of a measurement report with the predetermined signature as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method comprising: initializing a prioritization operation for camping on a New Radio (NR) standalone (SA) cell; after said initializing, detecting a trigger to establish a radio resource control (RRC) connection; and delaying a request for the RRC connection for a period of time.

Example 2 includes the method of example 1 or some other example herein, wherein the prioritization operation is to deprioritize camping on an NR SA cell.

Example 3 includes the method of example 2 or some other example herein, wherein delaying the RRC connection request comprises: initiating a connection delay timer based on detecting the trigger; determining an NR-to-Long Term Evolution (NR2L) reselection procedure is successful prior to expiration of the connection delay timer; and transmitting the request for the RRC connection to an evolved node B (eNB) based on determining the NR2L reselection procedure is successful prior to expiration of the connection delay timer.

Example 4 includes the method of example 2 or some other example herein, further comprising: performing a tracking area update after transmitting the request.

Example 5 includes the method of example 2 or some other example herein, wherein delaying the RRC connection request comprises: initiating a connection delay timer based on detecting the trigger; determining the connection delay timer expires before an NR-to-Long Term Evolution (NR2L) reselection procedure is successful; and transmitting the request for the RRC connection to a next-generation node B (gNB) based on determining the connection delay timer expires before the NR2L reselection procedure is successful.

Example 6 includes the method of example 1, wherein the prioritization operation is to re-prioritize camping on an NR SA cell.

Example 7 includes the method of example 6 or some other example herein, wherein delaying the RRC connection request comprises: initiating a connection delay timer based on detecting the trigger; determining a Long Term Evolution (LTE)-to-NR (L2NR) reselection procedure is successful prior to expiration of the connection delay timer; and transmitting the request for the RRC connection to a next-generation node B (gNB) based on determining the L2NR reselection procedure is successful prior to expiration of the connection delay timer.

Example 8 includes the method of example 6 or some other example herein, further comprising: performing a registration procedure with the gNB after transmitting the request.

Example 9 includes the method of example 6 or some other example herein, wherein delaying the RRC connection request comprises: initiating a connection delay timer based on detecting the trigger; determining the connection delay timer expires before a Long Term Evolution (LTE)-to-NR (L2NR) reselection procedure is successful; and transmitting the request for the RRC connection to an evolved node B (eNB) based on determining the connection delay timer expires before the L2NR reselection procedure is successful.

Example 10 includes the method of example 2, 6, or some other example, wherein the trigger is a first trigger and the method further comprises: detecting a second trigger; and initializing the prioritization operation based on said detecting the second trigger.

Example 11 includes the method of example 10 or some other example herein, wherein said detecting the second trigger is based on a message from an operating system of a user equipment.

Example 12 includes a method comprising: initializing, while in a radio resource control (RRC) connected mode, a prioritization operation for camping on a New Radio (NR) standalone (SA) cell; starting a measurement report (MR) timer; transmitting an MR with a predetermined signature; proceeding with or aborting a local release based on whether an inter-radio access technology (RAT) handover command is received prior to expiration of the MR timer.

Example 13 includes the method of example 12 or some other example herein, wherein the RRC connected mode is with a Long Term Evolution (LTE) cell provided by an evolved node B (eNB) or an NR cell provided by a next-generation node B (gNB).

Example 14 includes the method of example 12 or some other example herein, wherein the MR with the predetermined signature includes a maximum unconfigured identifier for a measurement identifier.

Example 15 includes the method of example 14 or some other example herein, wherein the MR with the predetermined signature is sent to a next generation node B (gNB) and further includes a maximum serving cell identifier or a maximum physical cell identifier.

Example 16 includes the method of example 14 or some other example herein, wherein the MR with the predetermined signature is sent to an evolved node B (eNB) and further includes a maximum reference signal receive power value or a maximum reference signal receive quality value.

Example 17 includes a method comprising: detecting a trigger to perform a prioritization operation while in a radio resource control (RRC) connected state, the prioritization operation to deprioritize new radio (NR) standalone (SA) camping or to reprioritize NR SA camping; if the prioritization operation is to deprioritize NR SA camping, pruning connected mode measurements that are configured by a network; and if the prioritization operation is to reprioritize NR SA camping, enabling connected mode measurements that are configured by a network.

Example 18 includes the method of example 17 or some other example herein, wherein the connected mode measurements are long term evolution (LTE)-to-new radio (NR) measurements.

Example 19 includes a method comprising: detecting a trigger to perform a prioritization operation while in a radio resource control (RRC) connected state; determining whether an unsuccessful attempt for a local release and reselection procedure has occurred within a predetermined period of time; and ignoring the trigger or attempting a local release and reselection procedure based on said determining of whether the unsuccessful attempt for a local release or reselection procedure has occurred within the predetermined period of time.

Example 20 includes the method of example 19 or some other example herein, further comprising determining that an unsuccessful attempt for local release and reselection procedure has occurred within the predetermined period of time; and ignoring the trigger based on said determining that an unsuccessful attempt for local release and reselection procedure has occurred within the predetermined period of time.

Example 21 includes the method of example 19 or some other example herein, further comprising determining that an unsuccessful attempt for local release and reselection procedure has not occurred within the predetermined period of time; and attempting a local release and reselection procedure based on said determining that an unsuccessful attempt for local release and reselection procedure has not occurred within the predetermined period of time.

Example 22 includes a method comprising: detecting a trigger to perform a prioritization operation for camping on a NR SA cell; determining, based on a network transmission, whether a gNB provides an SA cell or an NSA cell; and ignoring the trigger or performing the operation based on said determining whether the gNB provides an SA cell or an NSA cell.

Example 23 includes the method of example 22 or some other example herein, wherein the network transmission comprises a SIB2 transmission.

Example 24 includes the method of example 22 or some other example herein, further comprising: determining that the gNB provides an NSA cell; and ignoring the trigger based on said determining that the gNB provides the NSA cell.

Example 25 includes the method of example 22 or some other example herein, further comprising: determining that the gNB provides an SA cell; and performing a prioritization operation based on said determining that the gNB provides the SA cell.

Example 26 includes the method of example 25 or some other example herein, further comprising: detecting an RRC connection trigger before the prioritization operation completes;

determining whether the RRC connection trigger is based on an MT page; and initiating an RRC connection based on said determining whether the RRC connection trigger is based on an MT page.

Example 27 includes the method of example 26 or some other example herein, further comprising: determining that the RRC connection trigger is based on an MT page; and initiating the RRC connection without delay based on said determining that the RRC connection trigger is based on the MT page.

Example 28 includes the method of example 26 or some other example herein, further comprising: determining that the RRC connection trigger is not based on an MT page; and initiating the RRC connection at an earlier of a timer expiry or completion of the prioritization operation based on said determining that the RRC connection trigger is not based on an MT page.

Example 29 includes the method comprising: receiving, from a UE, the measurement report with a predetermined signature; determining, based on the predetermined signature, that the UE is to perform a prioritization operation to deprioritize NR SA camping or reprioritize NR SA camping; and supporting the prioritization operation.

Example 30 includes a method of example 29 or some other example herein, wherein supporting the prioritization operation comprises: transmitting a handover command to the UE; ignoring one or more KPIs based on a local release performed by the UE; or managing a state machine to avoid a mismatch due to the measurement report.

Example 31 may include an apparatus comprising means to perform one or more elements of a method described in or related to any of examples 1-30, or any other method or process described herein.

Example 32 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 33 may include an apparatus comprising logic, modules, or circuitry to perform one or more elements of a method described in or related to any of examples 1-30, or any other method or process described herein.

Example 34 may include a method, technique, or process as described in or related to any of examples 1-30, or portions or parts thereof.

Example 35 may include an apparatus comprising: one or more processors and one or more computer-readable media comprising instructions that, when executed by the one or more processors, cause the one or more processors to perform the method, techniques, or process as described in or related to any of examples 1-30, or portions thereof.

Example 36 may include a signal as described in or related to any of examples 1-30, or portions or parts thereof.

Example 37 may include a datagram, information element, packet, frame, segment, PDU, or message as described in or related to any of examples 1-30, or portions or parts thereof, or otherwise described in the present disclosure.

Example 38 may include a signal encoded with data as described in or related to any of examples 1-30, or portions or parts thereof, or otherwise described in the present disclosure.

Example 39 may include a signal encoded with a datagram, IE, packet, frame, segment, PDU, or message as described in or related to any of examples 1-30, or portions or parts thereof, or otherwise described in the present disclosure.

Example 40 may include an electromagnetic signal carrying computer-readable instructions, wherein execution of the computer-readable instructions by one or more processors is to cause the one or more processors to perform the method, techniques, or process as described in or related to any of examples 1-30, or portions thereof.

Example 41 may include a computer program comprising instructions, wherein execution of the program by a processing element is to cause the processing element to carry out the method, techniques, or process as described in or related to any of examples 1-30, or portions thereof.

Example 42 may include a signal in a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media (NTCRM) having instructions that are to be executed to cause processing circuitry to:

initialize a prioritization operation for camping on a New Radio (NR) standalone (SA) cell;

after initialization of the prioritization operation, detect a trigger to establish a radio resource control (RRC) connection; and after detection of the trigger and while the processing circuitry is in an RRC idle state with a cell, delay a request for the RRC connection with the cell for a period of time.

2. The one or more NTCRM of claim 1, wherein the prioritization operation is to deprioritize camping on an NR SA cell.

3. The one or more NTCRM of claim 2, wherein the instructions are to be executed to cause the processing circuitry further to:

initiate a connection delay timer based on detection of the trigger;

determine an NR-to-Long Term Evolution (NR2L) reselection procedure is successful prior to expiration of the connection delay timer; and generate the request for the RRC connection to an evolved node B (eNB) based on determination that the NR2L reselection procedure is successful prior to expiration of the connection delay timer.

4. The one or more NTCRM of claim 2, wherein the instructions are to be executed to cause the processing circuitry further to:

perform a tracking area update after transmission of the request.

5. The one or more NTCRM of claim 2, wherein the instructions are to be executed to cause the processing circuitry further to:

initiate a connection delay timer based on detection of the trigger;

determine the connection delay timer expires before an NR-to-Long Term Evolution (NR2L) reselection procedure is successful; and generate the request for the RRC connection to a next-generation node B (gNB) based on determination that the connection delay timer expires before the NR2L reselection procedure is successful.

6. The one or more NTCRM of claim 2, wherein the trigger is a first trigger and the instructions are to be executed to cause the processing circuitry further to:

detect a second trigger; and initialize the prioritization operation based on detection of the second trigger.

7. The one or more NTCRM of claim 6, wherein the said detect the second trigger is based on a message from an operating system.

8. The one or more NTCRM of claim 1, wherein the prioritization operation is to re-prioritize camping on an NR SA cell.

9. The one or more NTCRM of claim 8, wherein the instructions are to be executed to cause the processing circuitry further to:

initiate a connection delay timer based on detection of the trigger;

determine a Long Term Evolution (LTE)-to-NR (L2NR) reselection procedure is successful prior to expiration of the connection delay timer; and generate the request for the RRC connection to a next-generation node B (gNB) based on determination that the L2NR reselection procedure is successful prior to expiration of the connection delay timer.

10. The one or more NTCRM of claim 9, wherein the instructions are to be executed to cause the processing circuitry further to:

perform a registration procedure with the gNB after transmitting the request.

11. The one or more NTCRM of claim 8, wherein the instructions are to be executed to cause the processing circuitry further to:

initiate a connection delay timer based on detection of the trigger;

determine the connection delay timer expires before a Long Term Evolution (LTE)-to-NR (L2NR) reselection procedure is successful; and generate the request for the RRC connection to an evolved node B (eNB) based on determination that the connection delay timer expires before the L2NR reselection procedure is successful.

12. A method comprising:

initializing a prioritization operation for camping on a New Radio (NR) standalone (SA) cell;

after initialization of the prioritization operation, detecting a trigger to establish a radio resource control (RRC) connection; and after detection of the trigger and while in an RRC idle or connected state with a cell, delay a request for the RRC connection with the cell for a period of time.

13. The method of claim 12, wherein the prioritization operation comprises deprioritizing camping on an NR SA cell.

14. The method of claim 13, further comprising:

initiating a connection delay timer based on the detection of the trigger;

determining an NR-to-Long Term Evolution (NR2L) reselection procedure is successful prior to an expiration of the connection delay timer; and generating the request for the RRC connection to an evolved node B (eNB) based on determination that the NR2L reselection procedure is successful prior to the expiration of the connection delay timer.

15. The method of claim 13, further comprising:

performing a tracking area update after transmission of the request.

16. The method of claim 13, further comprising:

initiating a connection delay timer based on detection of the trigger;

determining the connection delay timer expires before an NR-to-Long Term Evolution (NR2L) reselection procedure is successful; and generating the request for the RRC connection to a next-generation node B (gNB) based on the determination that the connection delay timer expires before the NR2L reselection procedure is successful.

17. The method of claim 13, wherein the trigger is a first trigger and the method further comprises:

detecting a second trigger; and initializing the prioritization operation based on the detection of the second trigger.

18. The method of claim 12, wherein the prioritization operation comprises re-prioritizing camping on an NR SA cell.

19. The method of claim 18, the method further comprising:

initiating a connection delay timer based on the detection of the trigger;

determining a Long Term Evolution (LTE)-to-NR (L2NR) reselection procedure is successful prior to an expiration of the connection delay timer; and generating the request for the RRC connection to a next-generation node B (gNB) based on the determination that the L2NR reselection procedure is successful prior to the expiration of the connection delay timer.

20. The method of claim 18, the method further comprising:

initiating a connection delay timer based on the detection of the trigger;

determining the connection delay timer expires before a Long Term Evolution (LTE)-to-NR (L2NR) reselection procedure is successful; and generating the request for the RRC connection to an evolved node B (eNB) based on the determination that the connection delay timer expires before the L2NR reselection procedure is successful.

* * * * *